US008830585B2

(12) United States Patent
Hirai et al.

(10) Patent No.: US 8,830,585 B2
(45) Date of Patent: Sep. 9, 2014

(54) OPTICAL ELEMENT, POLARIZATION FILTER, OPTICAL ISOLATOR, AND OPTICAL APPARATUS

(75) Inventors: Hideaki Hirai, Kanagawa (JP); Toshimichi Nasukawa, Iwate (JP); Kazuhiro Umeki, Iwate (JP)

(73) Assignee: Ricoh Company, Ltd., Tokyo (JP)

( * ) Notice: Subject to any disclaimer, the term of this patent is extended or adjusted under 35 U.S.C. 154(b) by 160 days.

(21) Appl. No.: 13/255,171

(22) PCT Filed: Apr. 6, 2010

(86) PCT No.: PCT/JP2010/056492
§ 371 (c)(1),
(2), (4) Date: Sep. 7, 2011

(87) PCT Pub. No.: WO2010/125901
PCT Pub. Date: Nov. 4, 2010

(65) Prior Publication Data
US 2012/0002280 A1 Jan. 5, 2012

(30) Foreign Application Priority Data
Apr. 30, 2009 (JP) ................................ 2009-110415

(51) Int. Cl.
*G02B 5/30* (2006.01)
*G02B 27/28* (2006.01)
(52) U.S. Cl.
CPC .............. *G02B 27/28* (2013.01); *G02B 5/3025* (2013.01)
USPC ..................................... 359/575; 359/484.03
(58) Field of Classification Search
USPC ............................ 359/483.01–484.05, 484.1, 359/485.01–485.02, 485.05, 487.03, 359/487.05, 489.07, 486.01–486.02, 359/487.01, 487.04, 558–576
See application file for complete search history.

(56) References Cited

U.S. PATENT DOCUMENTS 6,424,436 B1    7/2002  Yamanaka
6,930,053 B2 *  8/2005  Mori et al. .................... 438/745
(Continued)

FOREIGN PATENT DOCUMENTS

EP    1 420 275 A1    5/2004
JP       2-8802 A     1/1990
(Continued)

OTHER PUBLICATIONS

Machine Translation of JP02096103A Japanese to English.*
(Continued)

*Primary Examiner* — Derek S Chapel
*Assistant Examiner* — Jeffrey Madonna
(74) *Attorney, Agent, or Firm* — Dickstein Shapiro LLP

(57) ABSTRACT

An optical element transmits incident light having a particular polarization direction mainly by 0-order transmission and diffracts incident light having a perpendicular polarization direction. The optical element includes a periodic structure having a period equal to or greater than the wavelength of the incident light. The periodic structure includes first and second subwavelength concave-convex structures formed perpendicularly adjacent to each other in each period of the periodic structure. The first and the second subwavelength concave-convex structures have a period less than the wavelength of the incident light. A filling factor and a groove depth of the first and the second subwavelength concave-convex structures are determined such that they have the same effective refraction index with respect to the incident light having the particular polarization direction and a phase difference π with respect to the incident light having the particular polarization direction.

6 Claims, 24 Drawing Sheets

(56) References Cited

U.S. PATENT DOCUMENTS

| | | |
|---|---|---|
| 2003/0179453 A1 | 9/2003 | Mori et al. |
| 2004/0165126 A1 | 8/2004 | Ooi et al. |
| 2006/0103778 A1 | 5/2006 | Ooi et al. |
| 2007/0029567 A1* | 2/2007 | Mori et al. .................. 257/98 |
| 2007/0229955 A1* | 10/2007 | Kawamura et al. ........... 359/569 |
| 2008/0106789 A1* | 5/2008 | Hirai et al. .................. 359/570 |
| 2009/0231981 A1 | 9/2009 | Hirai |
| 2009/0231982 A1 | 9/2009 | Hirai |
| 2010/0183956 A1* | 7/2010 | Matsubara ................... 359/9 |
| 2011/0002215 A1 | 1/2011 | Hirai |

FOREIGN PATENT DOCUMENTS

| | | |
|---|---|---|
| JP | 2-96103 A | 4/1990 |
| JP | 3-260616 A | 11/1991 |
| JP | 2000-180789 A | 6/2000 |
| JP | 2003-66232 A | 3/2003 |
| JP | 2006-113360 A | 4/2006 |
| JP | 2008-10050 A | 1/2008 |
| JP | 2009-223936 A | 10/2009 |
| JP | 2009-223937 A | 10/2009 |
| JP | 2009-223938 A | 10/2009 |
| JP | 2010-164749 A | 7/2010 |
| WO | WO 03/019247 A1 | 3/2003 |
| WO | WO 2007/077652 A1 | 7/2007 |
| WO | WO 2010/082408 A1 | 7/2010 |

OTHER PUBLICATIONS www.photonic-lattice.com/jp/PhCO3.html (with Partial English Translation).

* cited by examiner

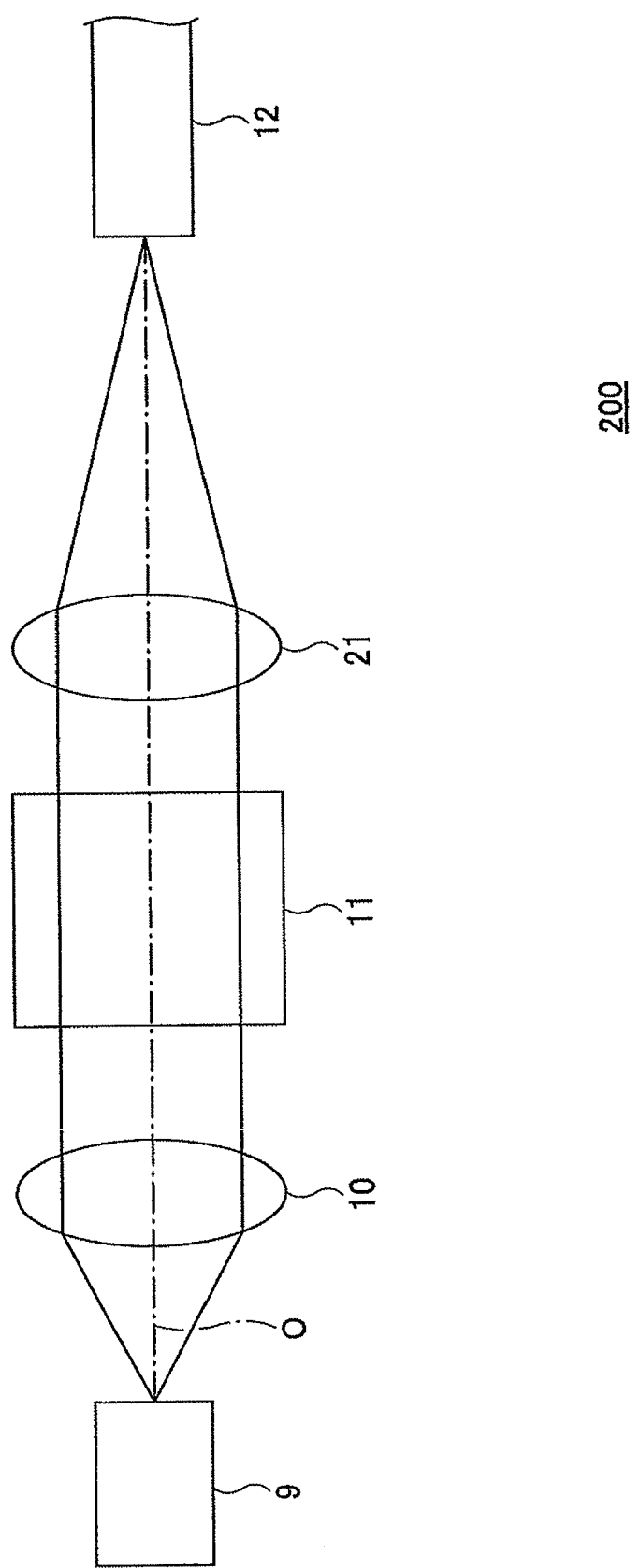

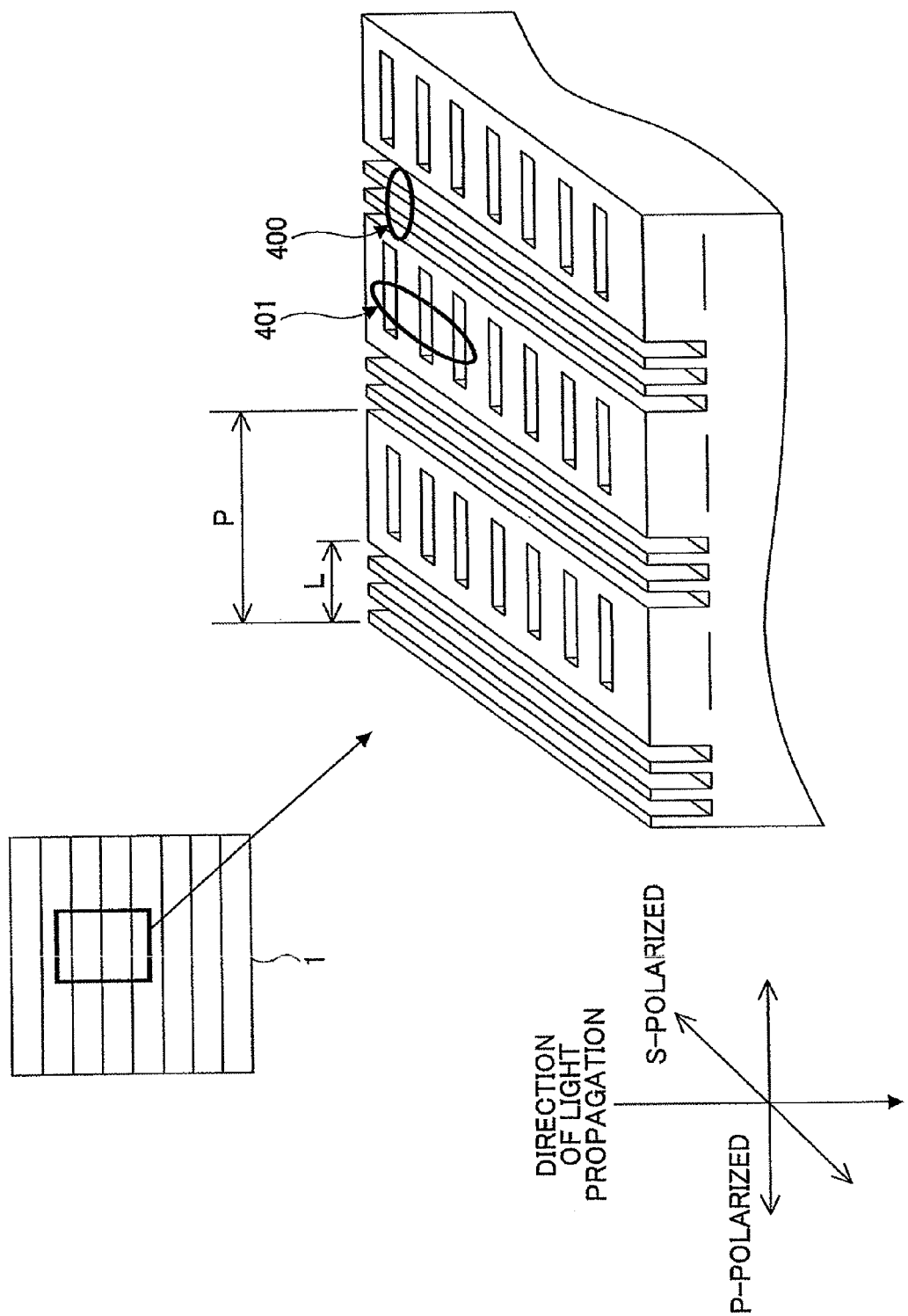

OPTICAL ELEMENT, POLARIZATION FILTER, OPTICAL ISOLATOR, AND OPTICAL APPARATUS

TECHNICAL FIELD

The present invention generally relates to an optical element capable of diffracting light depending on a polarization direction of the light, a polarization filter including the optical element, an optical isolator including the polarization filter and capable of transmitting light in one direction while blocking transmission of light in the opposite direction, and an optical apparatus having the optical isolator.

BACKGROUND ART

An optical isolator is a passive optical component having a pair of incident and emerging terminals. Typically, the optical isolator has low-loss characteristics with regard to forward direction light propagating from the incident side to the emerging side and high-loss characteristics with regard to backward direction light returning from the emerging side to the incident side, thus allowing the passage of the light only in a prescribed direction.

Such an optical isolator may include an optical system of a Faraday rotator configured to rotate a plane of polarization by 45°, the Faraday rotator being disposed between two polarizers having transmission axes displaced by 45° from each other. In this case, a polarized component of the forward direction light that is extracted by the polarizer on the incident side has its polarization direction rotated by +45° by the Faraday rotator, so that the polarized component corresponding to the direction of the polarizer on the emerging side can emerge from the optical isolator without attenuation. On the other hand, in the case of the backward direction light, the polarized component extracted by the polarizer on the emerging side has its polarization direction rotated by −45° by a nonreciprocal action of the Faraday rotator, so that the polarized component is perpendicular to the direction of the polarizer on the incident side. As a result, the backward direction light is attenuated and does not emerge from the incident side. This type of optical isolator in which the polarization direction of incident light is made to correspond to the polarization direction of the polarizer on the incident side in advance may be referred to as a polarization-dependent optical isolator.

Examples of the material of the polarizers in this type of optical isolator include a prism of a birefringent single-crystal, glass containing metal particles, and a composite multilayer film of dielectric and metal materials. For example, Japanese Laid-Open Patent Application No. 2006-113360 (Patent Document 1) discloses an optical terminal having an optical isolator. The optical isolator includes an incident-side polarizer, a magnetic garnet thick film, and an emerging-side polarizer, which are layered. The incident-side polarizer may comprise the Polarcor™ glass material having metal particle diffusion layers formed on both its sides. The emerging-side polarizer may also comprise the Polarcor™ glass material, with the metal particle diffusion layer on the emerging side having been removed (by polishing one side of a standard Polarcor™ product, which may have a thickness of 0.5 mm, down to a thickness of 0.2 mm, for example). It is discussed in Patent Document 1 that a permanent magnet 4 applies a magnetic field that causes the magnetic garnet thick film 12 to function as a Faraday rotator by which the plane of polarization of an optical signal is rotated, whereby the incident-side polarizer and the emerging-side polarizer pass polarized light of only a specific direction.

The materials used in the polarizer discussed in Patent Document 1 are expensive, and its manufacture requires various processing steps including cutting and optical polishing, which tend to make it difficult to reduce manufacturing cost as well as the cost of the optical isolator itself. In fact, more than half of the manufacturing cost of a conventional optical isolator may be due to the cost of polarizers.

In order to overcome the aforementioned problem, Japanese Laid-Open Patent Application No. 2000-180789 (Patent Document 2) discloses an optical isolator in which a reflecting-type first polarizer comprising a photonic crystal, a light-transmitting parallel-plate glass, a parallel-plate 45° Faraday rotator, and a reflecting-type second polarizer of a photonic crystal are arranged and fixed in parallel. One problem associated with this optical isolator is that the entire optical system needs to be disposed at an angle with the optical axis of incident light because of the use of the reflecting-type polarizers in the optical isolator. Such an inclined arrangement of the optical system results in a complex optical system layout.

DISCLOSURE OF THE INVENTION

The disadvantages of the prior art are overcome by the present invention which, in one aspect, is an optical element configured to transmit incident light having a particular polarization direction mainly by 0-order transmission and configured to diffract incident light having a polarization direction perpendicular to the particular polarization direction.

The optical element includes a periodic structure having a period equal to or greater than the wavelength of the incident light. The periodic structure includes first and second subwavelength concave-convex structures formed perpendicularly adjacent to each other in each period of the periodic structure. The first and the second subwavelength concave-convex structures have a period less than the wavelength of the incident light. A filling factor and a groove depth of the first and the second subwavelength concave-convex structures are determined such that the first and the second subwavelength concave-convex structures have the same effective refraction index with respect to the incident light having the particular polarization direction and a phase difference $\pi$ with respect to the incident light having the polarization direction perpendicular to the particular polarization direction.

In a preferred embodiment, the invention provides a polarization filter including the above optical element.

In another aspect, the invention provides an optical isolator comprising a polarization direction rotator disposed between a first polarization filter and a second polarization filter. The first and the second polarization filters are configured to transmit incident light having a particular polarization direction mainly by 0-order transmission and configured to diffract incident light having a polarization direction perpendicular to the particular polarization direction. The first and the second polarization filters include a periodic structure having a period equal to or greater than the wavelength of the incident light. The periodic structure includes first and second subwavelength concave-convex structures perpendicularly disposed adjacent to each other in each period of the periodic structure. The first and the second subwavelength concave-convex structures have a period less than the wavelength of the incident light. A filling factor and a groove depth of the first and the second subwavelength concave-convex structures are determined such that the first and the second subwavelength concave-convex structures have the same effective refraction index with respect to the incident light having the particular polarization direction and a phase difference $\pi$ with respect to the incident light having the polarization direction perpendicular to the particular polarization direction.

In another aspect, the invention provides an optical isolator comprising a polarization direction rotator; and a polarization filter formed on at least one side of the polarization direction rotator. The polarization filter is configured to transmit incident light having a particular polarization direction mainly by 0-order transmission and configured to diffract incident light having a polarization direction perpendicular to the particular polarization direction. The polarization filter includes a periodic structure having a period equal to or greater than the wavelength of the incident light. The periodic structure includes first and second subwavelength concave-convex structures formed perpendicularly adjacent to each other in each period of the periodic structure, the first and the second subwavelength concave-convex structures having a period less than the wavelength of the incident light. A filling factor and a groove depth of the first and the second subwavelength concave-convex structures are determined such that the first and the second subwavelength concave-convex structures have the same effective refraction index with respect to the incident light having the particular polarization direction and a phase difference $\pi$ with respect to the incident light having the polarization direction perpendicular to the particular polarization direction.

BRIEF DESCRIPTION OF THE DRAWINGS

A complete understanding of the present invention may be obtained by reference to the accompanying drawings, when considered in conjunction with the subsequent detailed description, in which

FIG. 2 is a schematic illustration of an optical apparatus including the optical isolator illustrated in FIG. 1;

FIG. 4A is a perspective view of a main portion of the polarization filter 1 illustrated in FIG. 3A, illustrating a lattice structure formed on a diffracting surface;

BEST MODE OF CARRYING OUT THE INVENTION

Embodiment 1

(Optical Isolator)

Figure 1:
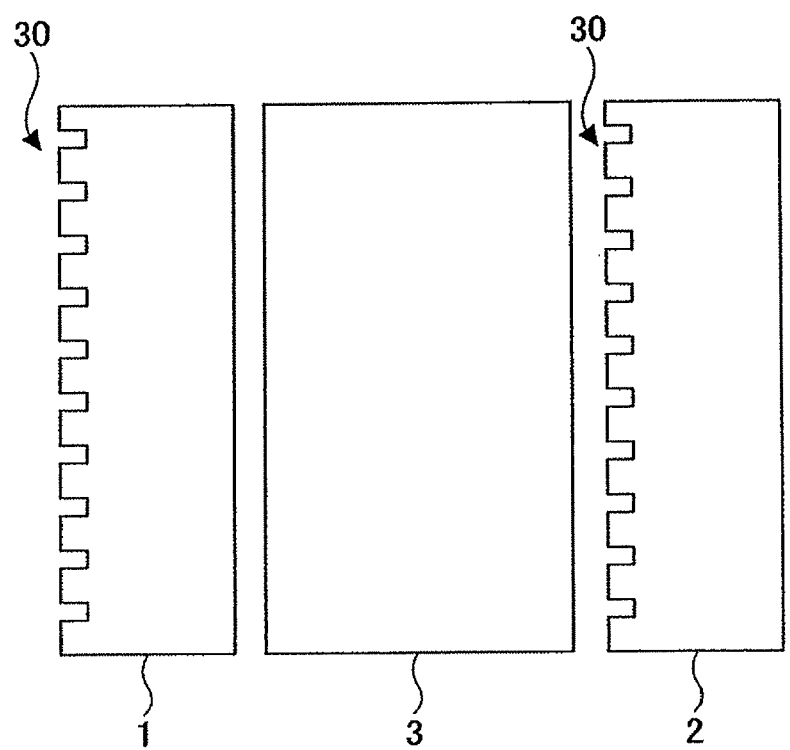
FIG. 1 is a schematic illustration of an optical isolator according to an embodiment of the present invention.

FIG. 1 is a schematic illustration of an optical isolator 11 according to an embodiment of the present invention. The optical isolator 11 includes a first polarization filter 1, a second polarization filter 2, and a 45° Faraday rotator 3 that are arranged in parallel and fixed to one another, using an adhesive, for example. The first and the second polarization filters 1 and 2 each include a diffracting surface 30 (diffracting structure) on one side. In the following description, for convenience's sake, a polarization direction perpendicular to the plane of the sheet of the drawing may be referred to as a P-polarized direction and a polarization direction within the plane of the sheet of the drawing may be referred to as a S-polarized direction. The first and the second polarization filters 1 and 2 are of a transmitting-diffraction type. The optical isolator 11 is disposed substantially perpendicular to the optical axis of incident light.

The first and the second polarization filters 1 and 2 are disposed so that their transmitting-polarization directions are at an angle of 45° with each other. The first and the second polarization filters 1 and 2 are diffracting elements having a diffracting structure with periods equal to or more than the wavelength of the incident light. Each period of the diffracting structure includes two patterns of subwavelength concave-convex structures that are disposed perpendicularly adjacent to each other, the two different patterns having periods less than the wavelength of the incident light. As will be described later with reference to Embodiment 4, a filling factor and a groove depth of the two patterns of subwavelength concave-convex structures are determined such that the two patterns have the same effective refraction index with respect to the incident light of S-polarized direction and a phase difference π with respect to the incident light of P-polarized direction.

The first and the second polarization filters 1 and 2 having large areas may be mass-produced by semiconductor processes, and do not require optical polishing. Details of the manufacturing method will be described with reference to Embodiment 5. The 45° Faraday rotator 3 may include a GdBiFe garnet thick film, to which a magnetic field is applied by a magnetic field applying unit (not shown) which may include a permanent magnet or an electromagnet in a direction along the propagation of light.

(Optical Apparatus)

FIG. 2 is a schematic illustration of an optical apparatus 200 including the optical isolator 11 illustrated in FIG. 1. The optical apparatus 200 includes a laser diode 9 configured to emit a laser beam that is shaped into a substantially parallel beam via a first lens 10. The parallel beam is incident on the optical isolator 11, and transmission light that has passed through the optical isolator 11 is focused by a second lens 21 at an end of an optical fiber 12. The laser diode 9, the first lens 10, the optical isolator 11, the second lens 21, and the optical fiber 12 are aligned with an optical axis O of the laser beam of light. The optical apparatus 200 may be used in an optical communication apparatus for optical fiber communications or in an optical information processing apparatus.

(Optical Path of Optical Isolator)

In FIGS. 1 and 2, the incident light is incident on the first polarization filter 1 of the optical isolator 11 and then has its P-polarized component diffracted by a first surface (where the diffracting structure is formed) of the first polarization filter 1. Most of the S-polarized component of the incident light is transmitted by 0-order transmission (dead-zone transmission). The 0-order-transmitted S-polarized component is perpendicularly incident on the 45° Faraday rotator 3, by which the polarization direction of the S-polarized component is rotated +45° and caused to emerge towards the second polarization filter 2 on the emerging side without being attenuated. Then, as in the case of the first polarization filter 1, the second polarization filter 2 diffracts the light of a polarization direction that is not to be used while allowing the transmission of the light of a polarization direction that is to be incident on the end of the optical fiber 12 by dead-zone transmission.

With regard to backward direction light, although the polarized component that has been transmitted through the second polarization filter 2 by 0-order transmission may have its polarization rotated by −45° by the nonreciprocal action of the Faraday rotator 3 and then become incident on the first polarization filter 1, such light is diffracted because it is perpendicular to the polarization direction of the incident light from the light source that is transmitted by 0-order transmission.

The first and the second polarization filters 1 and 2 are configured such that the light diffracted by each has a sufficient angle with the 0-order transmission light, so that the forward direction light can be prevented from becoming incident on the end of the optical fiber 12, and so that the backward direction light can be prevented from becoming incident on the laser diode 9. For example, the pitch of the diffracting structures is set so that the ±1st-order diffracted light has an angle of 10° or more.

(Structure of Polarization Filter)

Figure 3B:
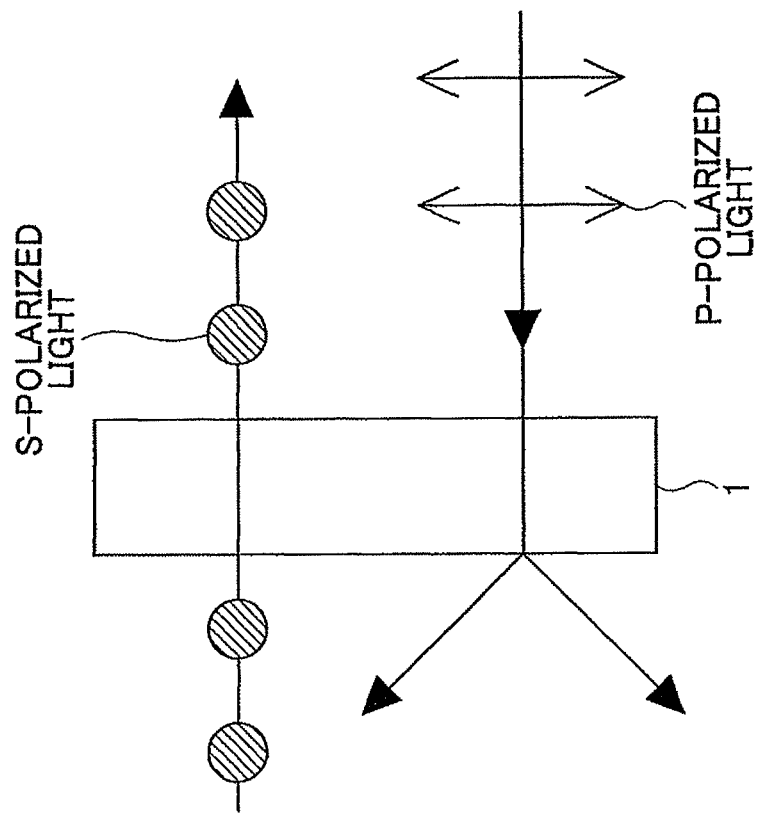
FIG. 3B is a schematic cross section of the polarization filter, illustrating a principle of operation of the polarization filter.
Figure 3A:
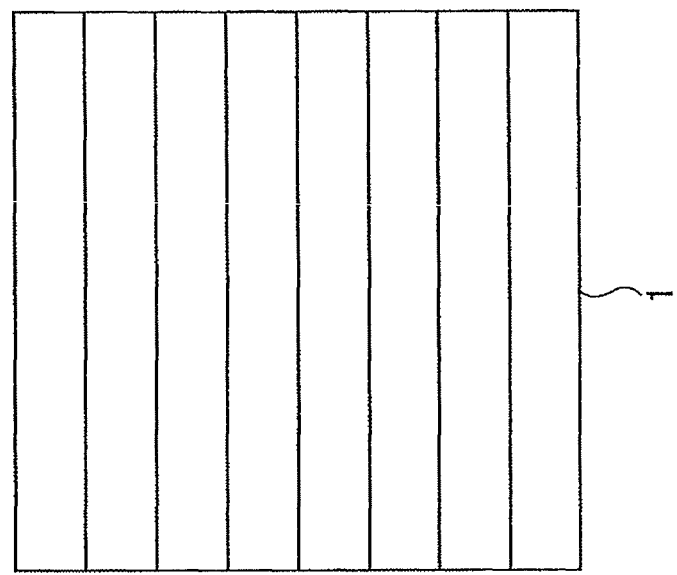
FIG. 3A is a schematic front view of a polarization filter used in the optical isolator of FIG. 1, illustrating its macroscopic structure.

The first polarization filter 1 is configured to diffract the P-polarized component while allowing the S-polarized component to be transmitted without diffracting it. With reference to FIGS. 3A and 3B, a macroscopic structure of the first polarization filter 1 is described. FIG. 3A is a schematic front view of the first polarization filter 1. FIG. 3B is a schematic cross section of the first polarization filter 1. The first polarization filter 1 includes a lattice-shaped diffracting surface (diffracting structure) configured to diffract the P-polarized component of light while allowing the S-polarized component of light to pass without diffracting it.

Figure 4C:
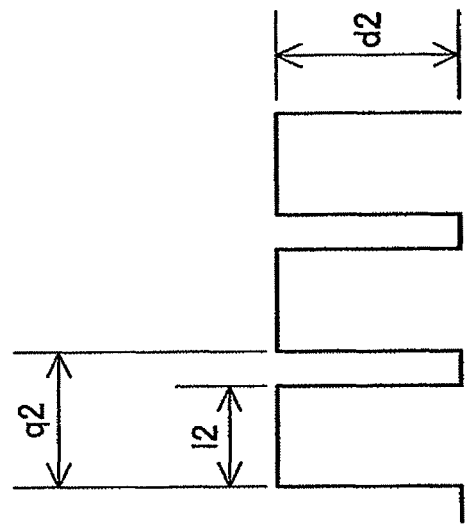
FIG. 4C illustrates the dimensions of a second subwavelength concave-convex structure 401 formed on the polarization filter 1 of FIG. 4A.
Figure 4B:
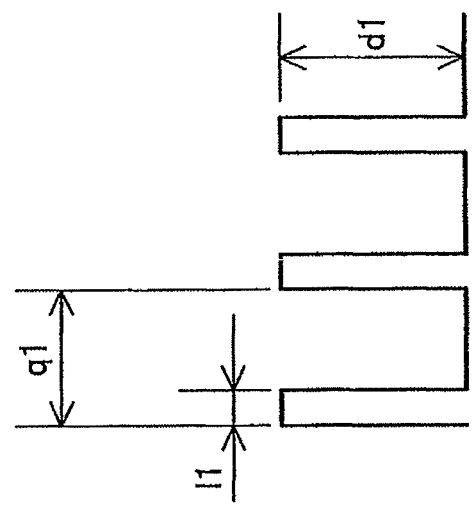
FIG. 4B illustrates the dimensions of a first subwavelength concave-convex structure 400 formed on the polarization filter 1 of FIG. 4A.

FIG. 4A is an enlarged perspective view of a main portion of the lattice formed on the diffracting surface of the first polarization filter 1 illustrated in FIGS. 3A and 3B. The enlarged view of FIG. 4A shows the lattice corresponding to three of the periods P each of which is equal to or greater than the wavelength of the incident light. As illustrated in FIG. 4A, the periodic structure of the lattice having the periods P includes subwavelength concave-convex structures 400 and 401. As illustrated in FIGS. 4B and 4C, the subwavelength concave-convex structures 400 and 401 have periods $q_1$ and $q_2$, respectively, which are shorter than the wavelength. The incident light is diffracted by the periodic structure whose periods correspond to the wavelength of the incident light or longer, and the subwavelength concave-convex structures 400 and 401 provide polarization selectivity in determining whether the P-polarized component or the S-polarized component of the light is diffracted. Thus, as illustrated in FIG. 3B, the first polarization filter 1 diffracts the P-polarized component and passes the S-polarized component by dead-zone transmission.

(Extinction Ratio)

Generally, an extinction ratio may be used when specifying a reflecting-type polarizer used in an optical isolator. The extinction ratio indicates the ratio of the transmittance of the S-polarized light, which may be the polarization direction to be used, to the transmittance of the P-polarized light, which may be the polarization direction not to be used. In accordance with the present embodiment of the present invention, the extinction ratio is expressed as the ratio of the diffraction efficiency of the 0-order light in the S-polarization direction to the diffraction efficiency of the 0-order light in the P-polarized direction.

Generally, a polarization filter is desired to have a high extinction ratio. While the first and the second polarization filters 1 and 2 illustrated in FIG. 1 each have the diffracting structure formed on only one side, this is merely an example. In another embodiment illustrated in FIG. 5, both the first and the second polarization filters 1 and 2 may have the diffracting surfaces (diffracting structures) formed on both sides of each optical element. Such a structure may increase the extinction ratio by the power of two. This is in contrast to Patent Document 1 where the structure employs a birefringent material, where two polarizers are required in order to increase the extinction ratio, resulting in an increase in the thickness of the optical isolator. In accordance with the embodiment of FIG. 5, the extinction ratio can be increased by simply forming the diffracting structures on both sides of the polarization filters 1 and 2.

Thus, in accordance with the present embodiment, a polarization filter and an optical isolator can be realized using only a surface structure that utilizes diffraction. Thus, the present embodiment enables the mass production of an optical isolator having polarization filters at low cost while maintaining optical characteristics comparable to those of conventional optical isolators. Specifically, the optical isolator 11 according to the present embodiment can be realized without using the conventional birefringent single-crystal prism or the glass containing metal particles, as discussed in Patent Document 1. Further, compared to the photonic crystal system discussed in Patent Document 2, the optical isolator 11 of the present embodiment does not require the formation of a multilayer film comprising a high-refraction index medium and a low-refraction index medium, thus enabling manufacture at low cost.

Further, because the polarization filter function can be obtained with the surface structure of the polarization filter alone which utilizes diffraction, the need for plural different materials is eliminated. In addition, because the polarization-diffracting function can be exhibited by the diffracting structure alone in which subwavelength concave-convex structures are superposed, the material of the polarization filter can be selected as desired. For example, the diffracting structure may be formed on a substrate material having a high transmittance, or the substrate surface may be coated with a different material on which the diffracting structure may then be formed, depending on the wavelength used. For high-power laser applications and the like, the diffracting structure may be formed on the surface of a material having light resistance.

Because such a method of manufacturing the optical element (polarization filter) according to the present embodiment does not require optical polishing of large areas, the optical element can be mass-produced at low cost without adversely affecting optical characteristics. Further, because the light in an undesired polarization direction is diffracted, the optical isolator does not need to be disposed at an angle, thus making it possible to realize a layout in which a light beam can be substantially perpendicularly incident on the optical isolator.

Embodiment 2

(Optical Isolator)

Next, an optical isolator according to another embodiment of the present invention is described. Because the polarization filter function can be realized by the diffracting structure alone formed on an optical element, an optical isolator structure illustrated in FIG. 6 may be employed. Specifically, a diffracting surface (diffracting structure) 31 having the function of the first polarization filter 1 may be formed on a surface on the incident side of the Faraday rotator 3, and a diffracting surface (diffracting structure) 32 having the function of the second polarization filter 2 may be formed on a surface on the emerging side of the Faraday rotator 3. The diffracting structures 31 and 32 may be directly formed on the surfaces of the Faraday rotator 3, or the surfaces of the Faraday rotator 3 may be initially coated with a separate material, and then the diffracting structures 31 and 32 may be formed on the coated surfaces. Thus, in accordance with the present embodiment illustrated in FIG. 6, an optical isolator function can be provided by the single optical element.

Figure 6:
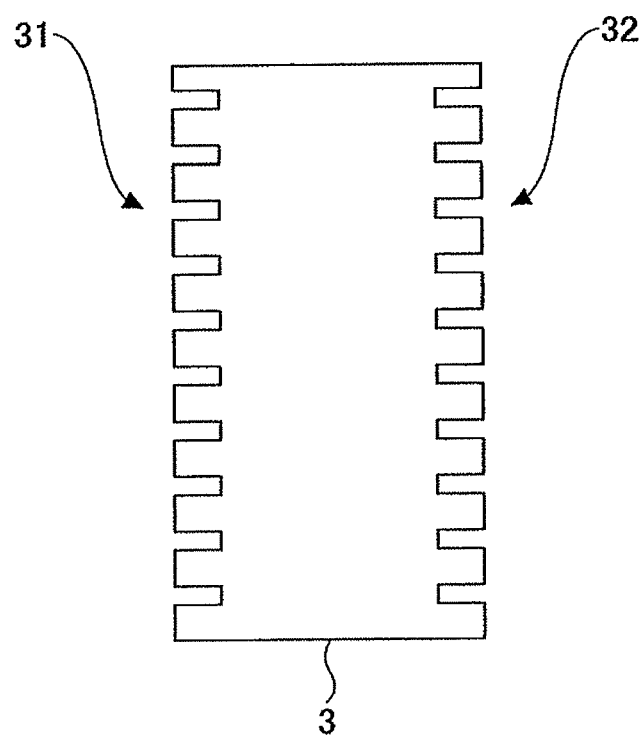
FIG. 6 illustrates an optical isolator according to another embodiment of the present invention.

In the optical isolator according to the embodiment illustrated in FIG. 6, because the polarization filters and the Faraday rotator are integrated, the optical isolator 11 can be handled more easily and made smaller in size as an optical system than the structure comprising a Faraday rotator disposed between polarizers. Further, because the polarization-diffracting function can be provided by the diffracting structure alone in which subwavelength concave-convex structures are superposed, the material of the optical isolator can be selected as desired. Thus, as illustrated in FIG. 6, the diffracting structures 31 and 32 may be directly formed on the Faraday rotator 3, or the surface of the Faraday rotator 3 may be coated with a material and then the diffracting structures 31 and 32 may be formed on the coated surfaces.

Embodiment 3

Figure 7:
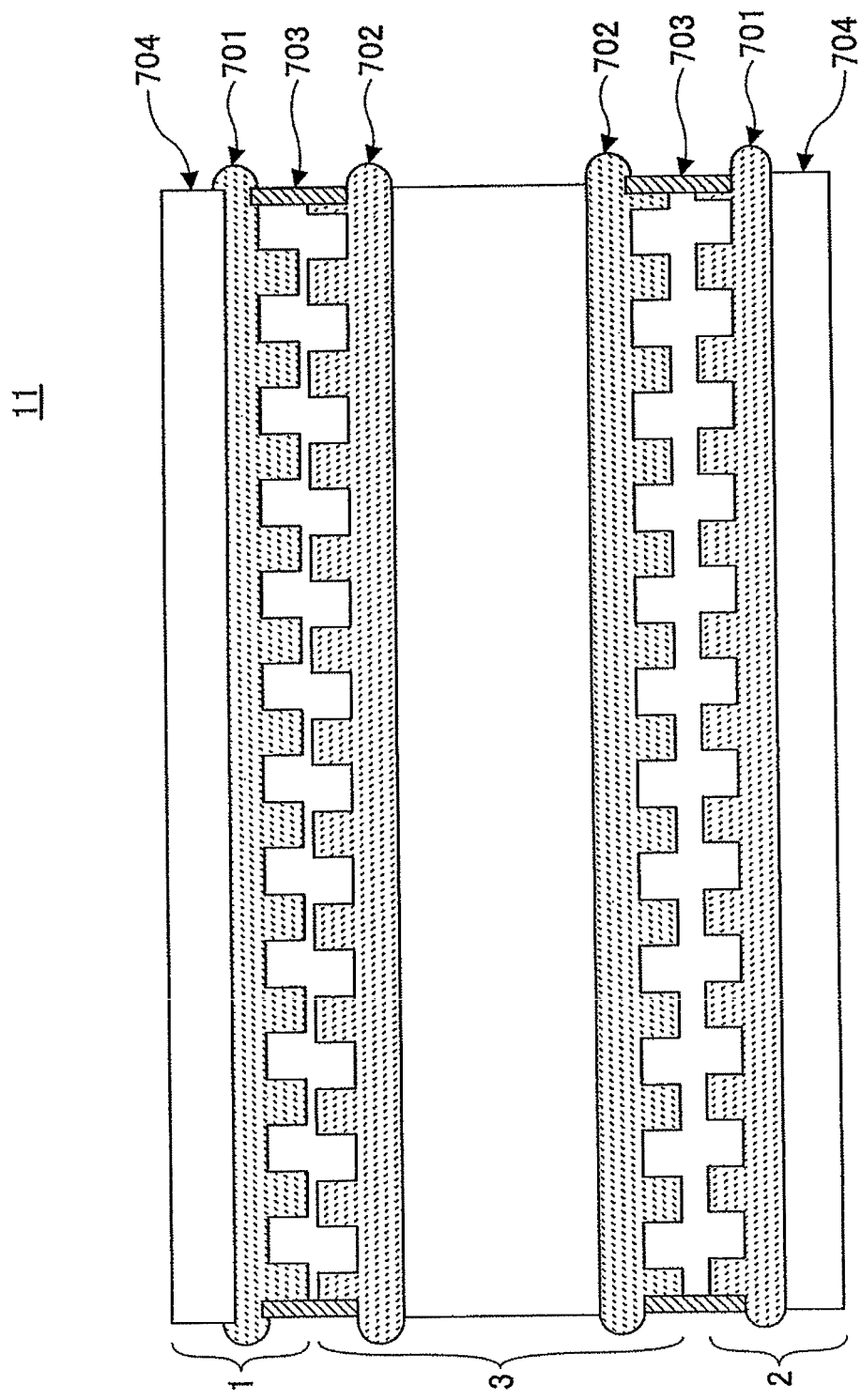
FIG. 7 illustrates an optical isolator according to another embodiment of the present invention.

FIG. 7 illustrates an optical isolator 11 in which the structures according to Embodiments 1 and 2 are combined. The optical isolator 11 illustrated in FIG. 7 includes a Faraday rotator 3 on both sides of which the diffracting structures 702 including the subwavelength concave-convex structures are formed after coating the sides with a separate material. The first and the second polarization filters 1 and 2 including the corresponding subwavelength concave-convex structures 701 formed on corresponding substrates 704 are then disposed opposite the corresponding diffracting structures 702. Gap retainers 703 may be provided between the opposing diffracting structures 701 and 702 in order to maintain predetermined gaps between them.

While the diffracting structures 701 of the first and the second polarization filters 1 and 2 may not be disposed facing each other, doing so prevents the exposure of the diffracting structures 701 to the outside, thereby preventing the diffracting structures 701 from being damaged or influenced by dust and the like. Further, the external surface may be polished to reduce the thickness of the optical isolator 11 or adjust its optical path length.

While the optical isolator 11 according to Embodiments 1 and 2 employs the Faraday rotator 3, the Faraday rotator 3 may be replaced with a polarization rotating element such as a wavelength plate. In this case, the need for application of a magnetic field may be eliminated, so that the structure of the optical isolator 11 may be simplified. Such a wavelength plate may include a birefringent material such as a crystal, or the subwavelength concave-convex structure used in the polarization filter 1 or 2 of the foregoing embodiments. Alternatively, the polarization filter may be provided on the front side alone of the Faraday rotator, in which case a further decrease in thickness or cost may be achieved, although the extinction ratio may decrease.

Embodiment 4

(Polarization Filter)

A structure of the first polarization filter 1 of the optical isolator 11 of Embodiment 1 is described. The second polarization filter 2 may have the same structure. With regard to the polarization filters (diffracting structures 31 and 32) of the optical isolator of Embodiment 2, although the refraction index of the base material on which the diffracting structure is formed may differ, the same method of setting parameters may be used.

(Macroscopic Structure of Polarization Filter)

As described above, a macroscopic structure of the polarization filters 1 and 2 is illustrated in FIGS. 3A and 3B. The first polarization filter 1 includes the lattice-shaped diffracting surface (diffracting structure) configured to diffract the P-polarized component while allowing the transmission of the S-polarized component without diffracting it.

As illustrated in FIG. 4A, the polarization filter 1 includes the subwavelength concave-convex structures 400 and 401 formed on the periodic structure whose periods P corresponds to the wavelength of the incident light or longer. Referring to FIG. 4B, the subwavelength concave-convex structure 400 includes grooves in a direction corresponding to the P-polarized direction, the grooves having a period q1 less than the wavelength of the incident light. Referring to FIG. 4C, the subwavelength concave-convex structure 401 includes grooves in a direction corresponding to the S-polarization direction, the grooves having a period q2 less than the wavelength of the incident light.

Figure 11:
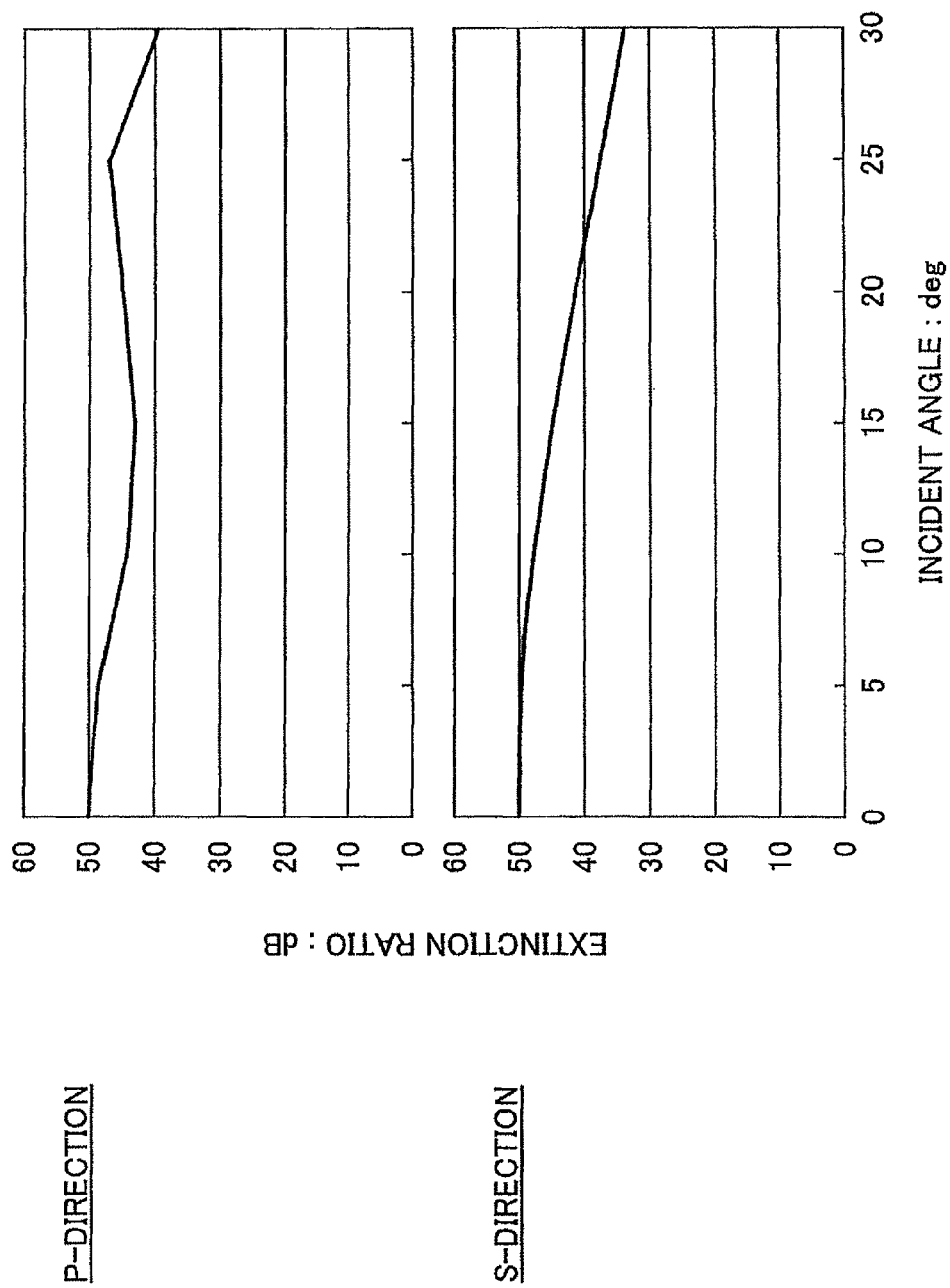
FIG. 11 is a graph indicating the extinction ratio of the polarization filter according to Embodiment 4 depending on incident angle.
Figure 12:
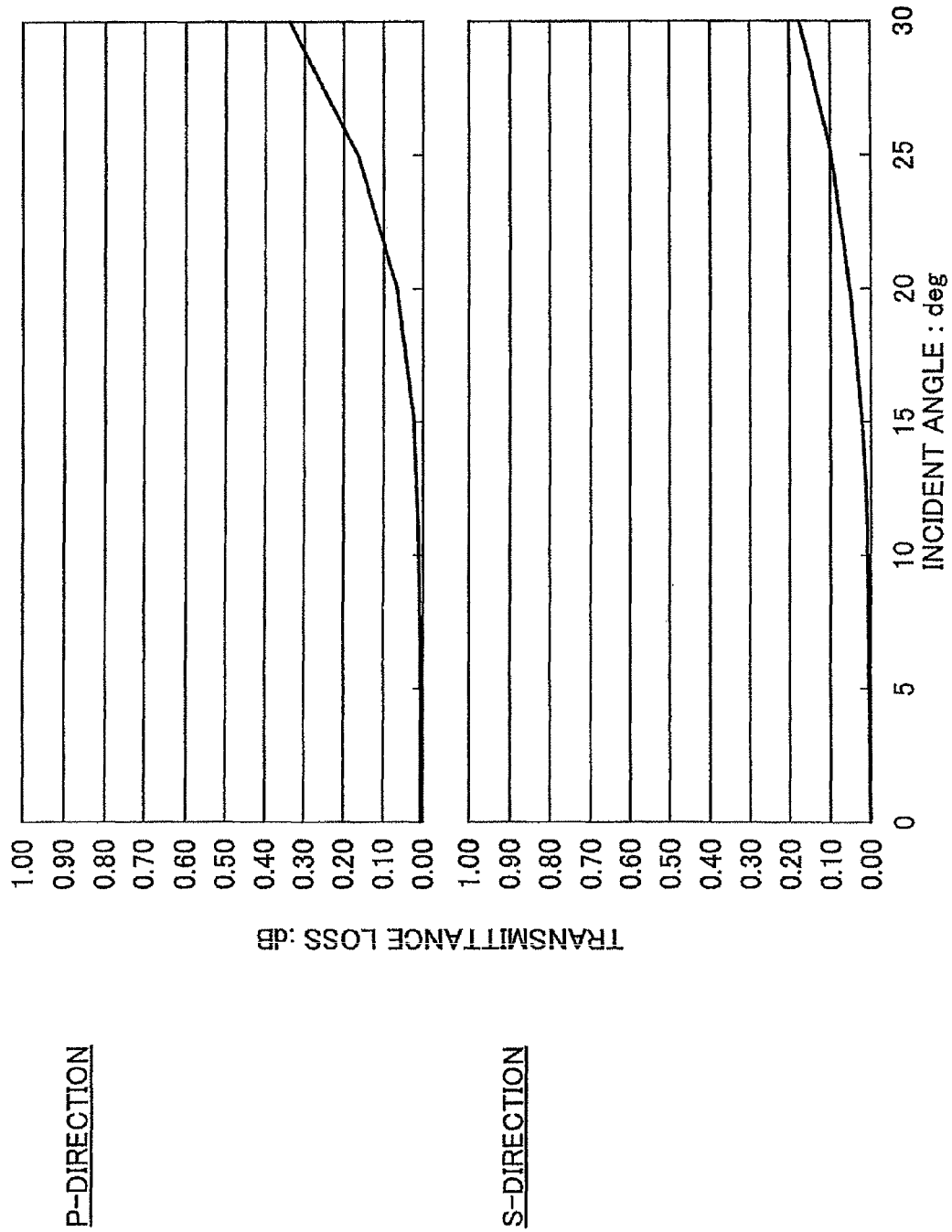
FIG. 12 is a graph indicating the transmittance loss of the polarization filter according to embodiment 4 depending on incident angle.

Referring to FIG. 4A, the first polarization filter 1 has a duty ratio expressed by L/P, where L is the width of the area in which the subwavelength concave-convex structure 400 is formed. The ratio L/P is used for calculating diffraction efficiency, for example, as will be described later. Referring to FIG. 4B, 11 designates the width of a convex portion of the subwavelength concave-convex structure 400. The ratio of 11 to q1 (11/q1) is referred as a "filling factor" which may be used for calculating an effective refraction index as will be described later. Referring to FIG. 4C, 12 designates the width of a convex portion of the subwavelength concave-convex structure 401. The ratio of 12 to q2 (12/q2) is referred to as a "filling factor" which may be used for calculating an effective refraction index as will be described later. d1 is a groove depth of the subwavelength concave-convex structure 400. d1 and d2 are respective groove depths of the subwavelength concave-convex structures 400 and 401.

Thus, the polarization filter 1 includes the periodic structure having the periods P equal to or greater than the wavelength of the incident light, on which the subwavelength concave-convex structures 400 and 401 are formed. The polarization filter 1 diffracts the incident light based on the periodic structure corresponding to the wavelength or longer, while the subwavelength concave-convex structures 400 and 401 provides the polarization selectivity determining whether the P-polarized component or the S-polarized component is diffracted. Thus, as illustrated in FIG. 3B, the polarization filter 1 diffracts the incident light when the P-polarized component is incident while transmitting the S-polarized component by dead-zone transmission.

The subwavelength concave-convex structures 400 and 401 formed on the diffracting surface of the polarization filter 1 exhibit a structural birefringence property which is generally known. The structural birefringence property refers to the phenomenon in which, when two kinds of media having different refraction indexes are disposed in stripes at periods shorter than the wavelength of the incident light, a polarized component (TE wave) parallel to the stripes and a polarized component (TM wave) perpendicular to the stripes are produced at different refraction indexes (effective refraction indexes), thus providing a birefringent action.

It is now assumed that air and a medium having a refraction index n are considered as the two kinds of media having different refraction indexes and that the light having a wavelength twice or more than the periods of the subwavelength concave-convex structure is perpendicularly incident. In this case, the effective refraction index n of the subwavelength concave-convex structure is given by the following expressions, depending on whether the polarization direction of the incident light is parallel (TE direction) or perpendicular (TM direction) to the grooves of the subwavelength concave-convex structure:

$$n(TE) = \sqrt{((t \cdot n^2) + (1-t))} \quad (1)$$

$$n(TM) = \sqrt{((t/n^2) + (1-t))} \quad (2)$$

where t is the aforementioned filling factor.

Figure 8:
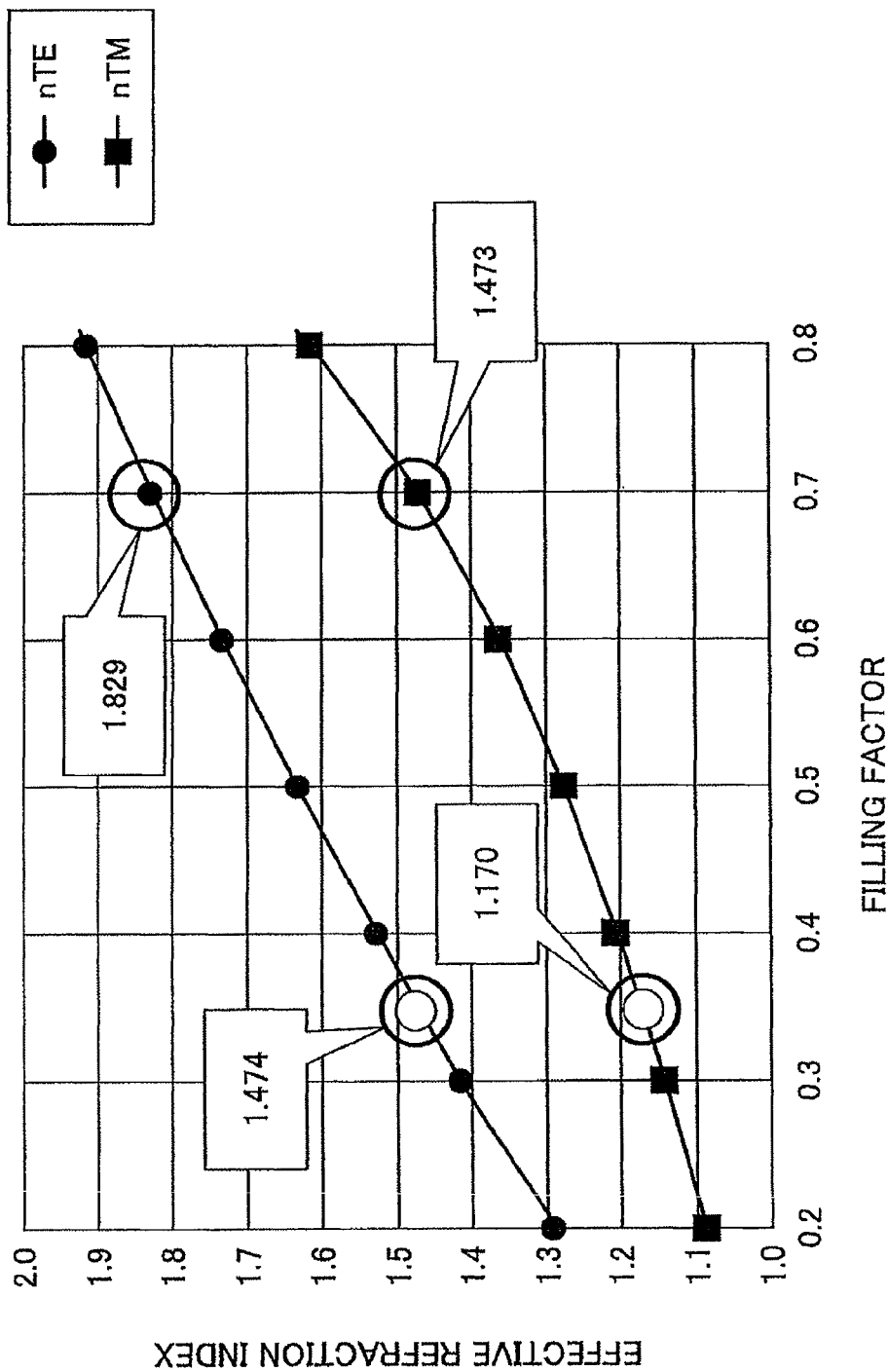
FIG. 8 is a graph indicating the relationship between the filling factor and the refraction index of a polarization filter according to Embodiment 4 for different polarization directions.

FIG. 8 is a graph indicating the refraction index with respect to the filling factor for the different polarization directions. The values of the refraction index shown were calculated using the refraction index n=2.086 of the wavelength 1550 nm of $Ta_2O_5$.

The filling factor t of the subwavelength concave-convex structures 400 and 401 illustrated in FIG. 4 is as follows.

$$t1 = l1/q1 \quad (3)$$

$$t2 = l2/q2 \quad (4)$$

where t1 is the filling factor of the subwavelength concave-convex structure 400, and t2 is the filling factor of the subwavelength concave-convex structure 401.

Thus, the effective refraction index n of the subwavelength concave-convex structures 400 and 401 in the TE and TM directions is as follows.

$$n(TE, 101) = \sqrt{((t1 \cdot n^2) + (1-t1))} \quad (7)$$

$$n(TM, 101) = \sqrt{((t1/n^2) + (1-t1))} \quad (8)$$

$$n(TE, 102) = \sqrt{((t2 \cdot n^2) + (1-t2))} \quad (9)$$

$$n(TM, 102) = \sqrt{((t2/n^2) + (1-t2))} \quad (10)$$

where n(TE, 101) is the effective refraction index of the subwavelength concave-convex structure 400 in the TE direction; n(TM, 101) is the effective refraction index of the subwavelength concave-convex structure 400 in the TM direction; n(TE, 102) is the effective refraction index of the subwavelength concave-convex structure 401 in the TE direction; and n(TM, 102) is the effective refraction index of the subwavelength concave-convex structure 401 in the TM direction.

A phase difference is calculated as follows:

$$\psi(P\text{-polarized}) = |(2\pi/1570 \text{ nm})(n(TM,101) \cdot d1 - n(TE, 102) \cdot d2)| \quad (11)$$

$$\psi(S\text{-polarized}) = |(2\pi/1570 \text{ nm})(n(TE,101) \cdot d1 - n(TM, 102) \cdot d2)| \quad (12)$$

where $\psi$(P-polarized) is the phase difference between the subwavelength concave-convex structures 400 and 401 when the P-polarized direction light is incident; $\psi$(S-polarized) is the phase difference between the subwavelength concave-convex structures 400 and 401 when the S-polarization direction light is incident; and d1 and d2 are the groove depths of the subwavelength concave-convex structures 400 and 401, respectively. Thus, the phase differences $\psi$(P-polarized) and $\psi$(S-polarized) can be adjusted by appropriately selecting the filling factors t1 and t2 and the groove depths d1 and d2.

In accordance with an embodiment of the present invention, the filling factors t1 and t2 and the groove depths d1 and d2 of the subwavelength concave-convex structures 400 and 401 are determined such that the subwavelength concave-convex structures 400 and 401 have the same effective refraction index n with respect to the incident light having a specific polarization direction (such as S-polarized light), and have a phase difference π with respect to the incident light having a polarization direction (such as P-polarized light) perpendicular to the specific polarization direction.

(Specific Values and Diffraction Efficiency Characteristics of Diffracting Structure)

The periods P of the polarization filter 1 may be greater than the wavelength used. The duty (L/P) ratio of the diffraction grating may be 0.5. The periods q1 and q2 of the subwavelength concave-convex structures may be sufficiently shorter than the wavelength used. Preferably, the periods q1 and q2 may be equal to or less than half the light source wavelength. For example, when the light source wavelength is 1570 nm, the periods q1 and q2 may be less than 785 nm.

The polarization filter 1 includes the lattice-shaped diffracting surface configured to diffract the P-polarized component and allow the S-polarized component to pass without diffracting it. In order to pass the S-polarized component by dead-zone transmission, the phase difference needs to be 0 or 2nπ (n=integer). Specific values are indicated below by way of example:

When n=2.086, t1=0.35, and t2=0.70,
n(TE, 101)=1.474
n(TM, 101)=1.170 n(TE, 102)=1.829
n(TM, 102)=1.473

When the subwavelength concave-convex structures 400 and 401 have the same groove depth d, ψ(P-polarized)=(2πd/1550 nm)(1.829-1.170)
ψ(S-polarized)≈0

Figure 9:
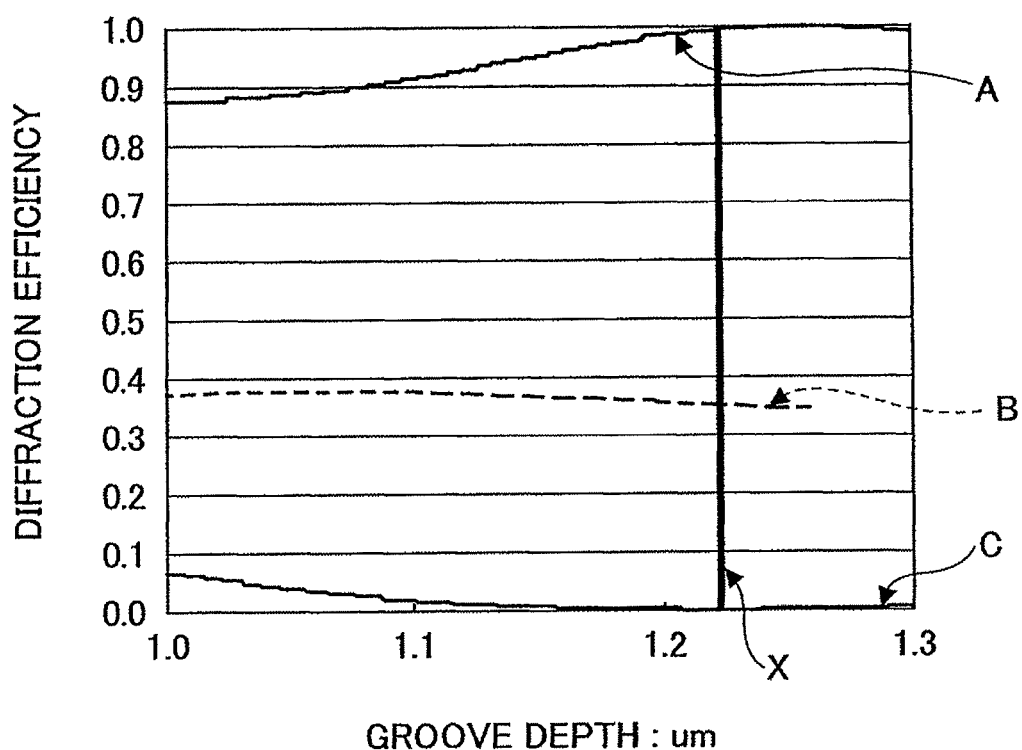
FIG. 9 is a graph indicating the diffraction efficiency of the polarization filter of Embodiment 4 relative to groove depth.

FIG. 9 is a graph illustrating the diffraction efficiency of the polarization filter 1 with respect to the groove depth when light with the wavelength 1550 nm is incident on the polarization filter 1 under the aforementioned conditions. In FIG. 9, "A" indicates the 0-order efficiency in the S-polarized direction; "B" indicates the 1st-order efficiency in the P-polarized direction; and "C" indicates the 0-order efficiency in the P-polarized direction. The vertical axis indicates the diffraction efficiency and the horizontal axis indicates the groove depth d of the subwavelength concave-convex structure. As for the S-polarized component, dead-zone transmission occurs, so that the 0-order light is 1.0 and no ±1st-order diffracted light is produced. On the other hand, because the P-polarized component is diffracted, a groove depth is selected such that the 0-order light component can be minimized.

For example, the groove depth d=1.255 μm indicated by a line X in FIG. 9 is desirable. When the subwavelength concave-convex structures 400 and 401 have the same groove depth d=1.255 μm, the phase difference between the subwavelength concave-convex structures 400 and 401 when light of the P-polarized direction is incident is as follows:

$$\psi(P\text{-polarized}) = (2\pi \times 1.255 \ \mu m/1550 \ nm)(1.829 - 1.170)$$
$$= (1.619\pi)(0.659)$$
$$\approx \pi$$

Thus, the P-polarized component can be efficiently diffracted.

Thus, in accordance with the present embodiment, because a polarization filter can be realized with the surface structure alone that utilizes diffraction, an optical isolator having the polarization filter can be mass-produced at low cost while maintaining optical characteristics comparable to those of conventional optical isolators. Specifically, the polarization filter can be realized without using the conventional birefringent single-crystal prism or the glass containing metal particles, as discussed in Patent Document 1. Further, the polarization filter according to the present embodiment does not require the multilayer film having a high refraction index medium and a low-refraction index medium in the photonic crystal system discussed in Patent Document 2. Thus, the polarization filter can be manufactured at less cost.

Further, because the polarization-diffracting function may be obtained with the diffracting structure alone in which subwavelength concave-convex structures are superposed, the material of the polarization filter can be selected as desired. For example, the diffracting structure may be formed on a substrate material having a high transmittance, or the diffracting structure may be formed on a surface of the substrate that is coated with a separate material, depending on the wavelength used. Alternatively, the diffracting structure may be directly formed on the surface of a Faraday rotator, as in the case of the optical isolator of Embodiment 2. Further, because a method of manufacturing the polarization filter according to an embodiment of the present invention does not require optical polishing of large areas, the polarization filter can be manufactured at low cost without adversely affecting its optical characteristics.

Figure 10:
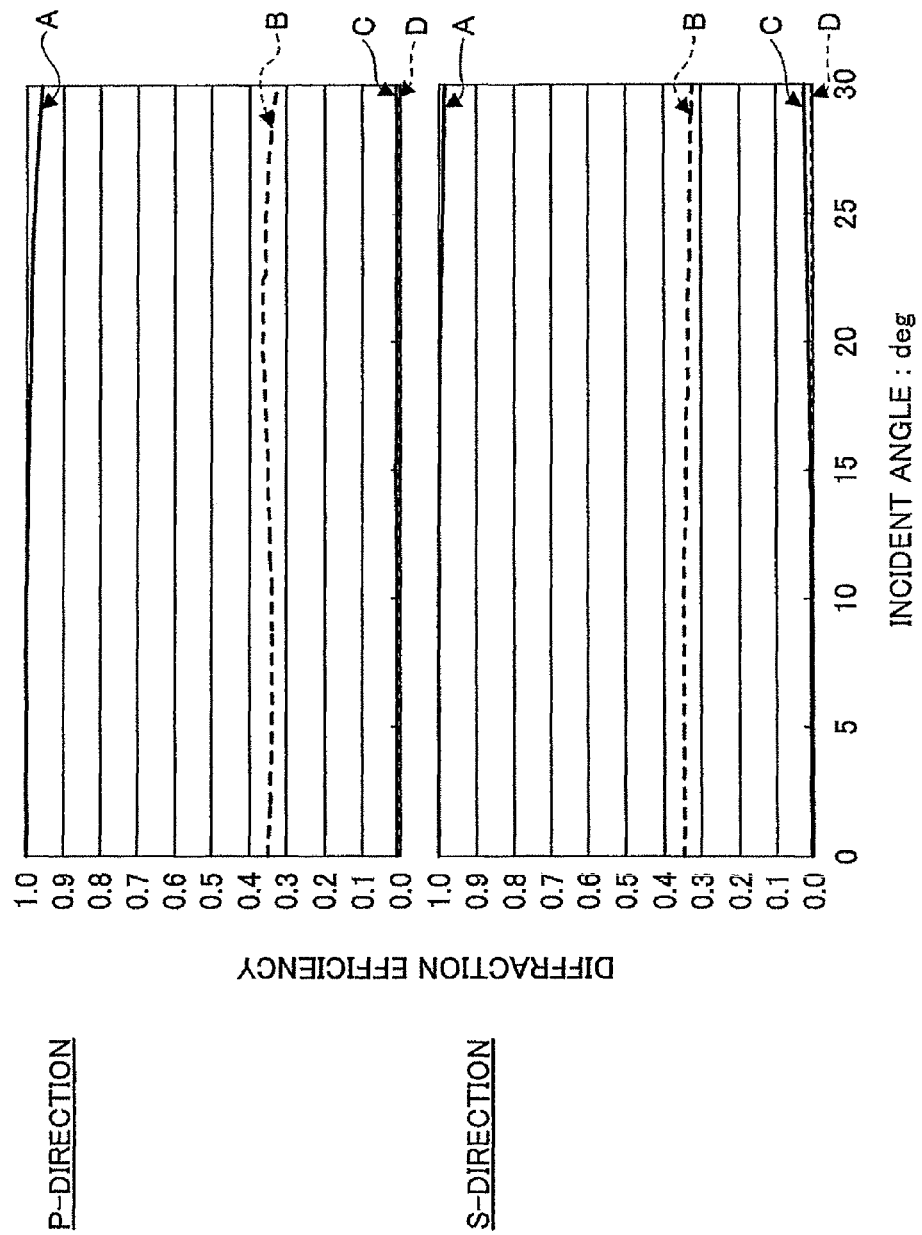
FIG. 10 is a graph indicating the diffraction efficiency of the polarization filter according to Embodiment 4 depending on incident angle.

Because the light in unwanted directions is diffracted in the polarization filter according to the present embodiment, the need for disposing the optical isolator at an angle can be eliminated, so that a layout can be realized in which light is substantially perpendicularly incident on the optical isolator. FIGS. 10 through 12 are graphs indicating the diffraction efficiency (FIG. 10), extinction ratio (FIG. 11), and transmittance loss (FIG. 12) of the polarization filter 1 with respect to the incident angle, which were calculated using the aforementioned example values. In FIG. 10, "A" indicates the 0-order transmission of the S-polarized light; "B" indicates the 1st-order diffraction of the P-polarized light; "C" indicates the 0-order transmission of the P-polarized light; and "D" indicates the 1st-order diffraction of the S-polarized light.

In accordance with the present embodiment, the polarization filter has flat characteristics in a range of incident angle ±10°. For example, a 45°-incident layout may be adopted, in which case the subwavelength structures may be designed accordingly. Thus, the polarization filter of the present embodiment may be used in a range of incident angle θ±10°.

Figure 13:
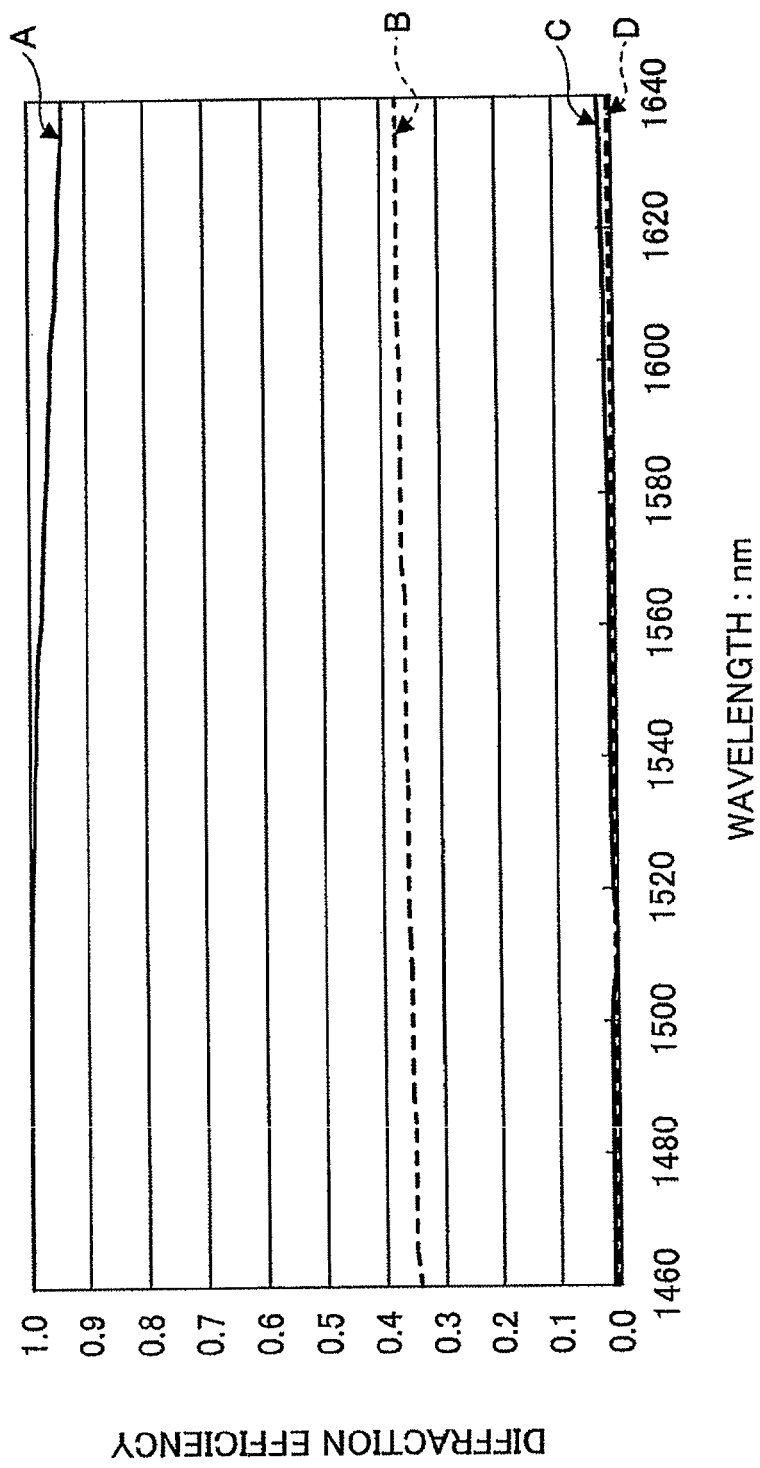
FIG. 13 is a graph indicating the diffraction efficiency of the polarization filter according to Embodiment 4 depending on wavelength.
Figure 14:
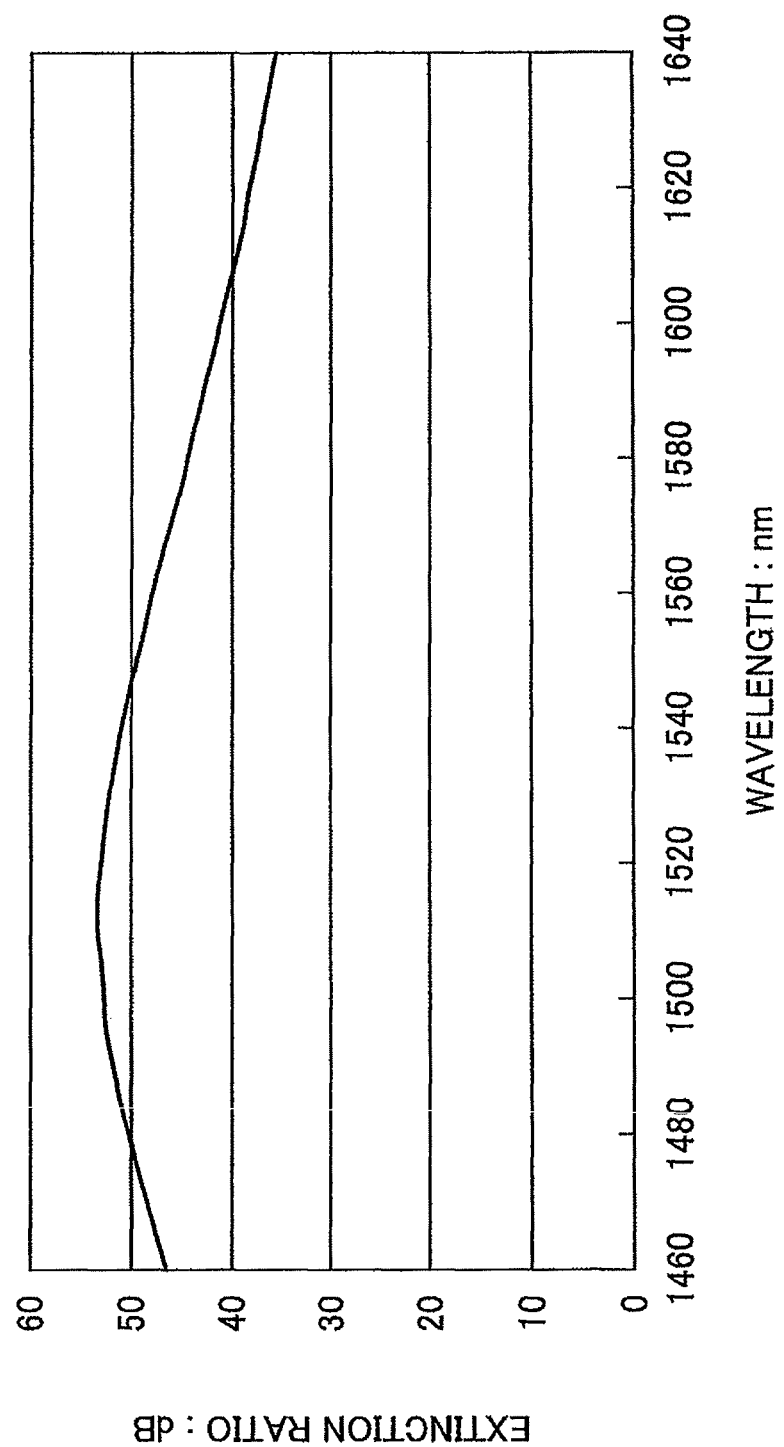
FIG. 14 is a graph indicating the extinction ratio of the polarization filter according to Embodiment 4 depending on wavelength.
Figure 15:
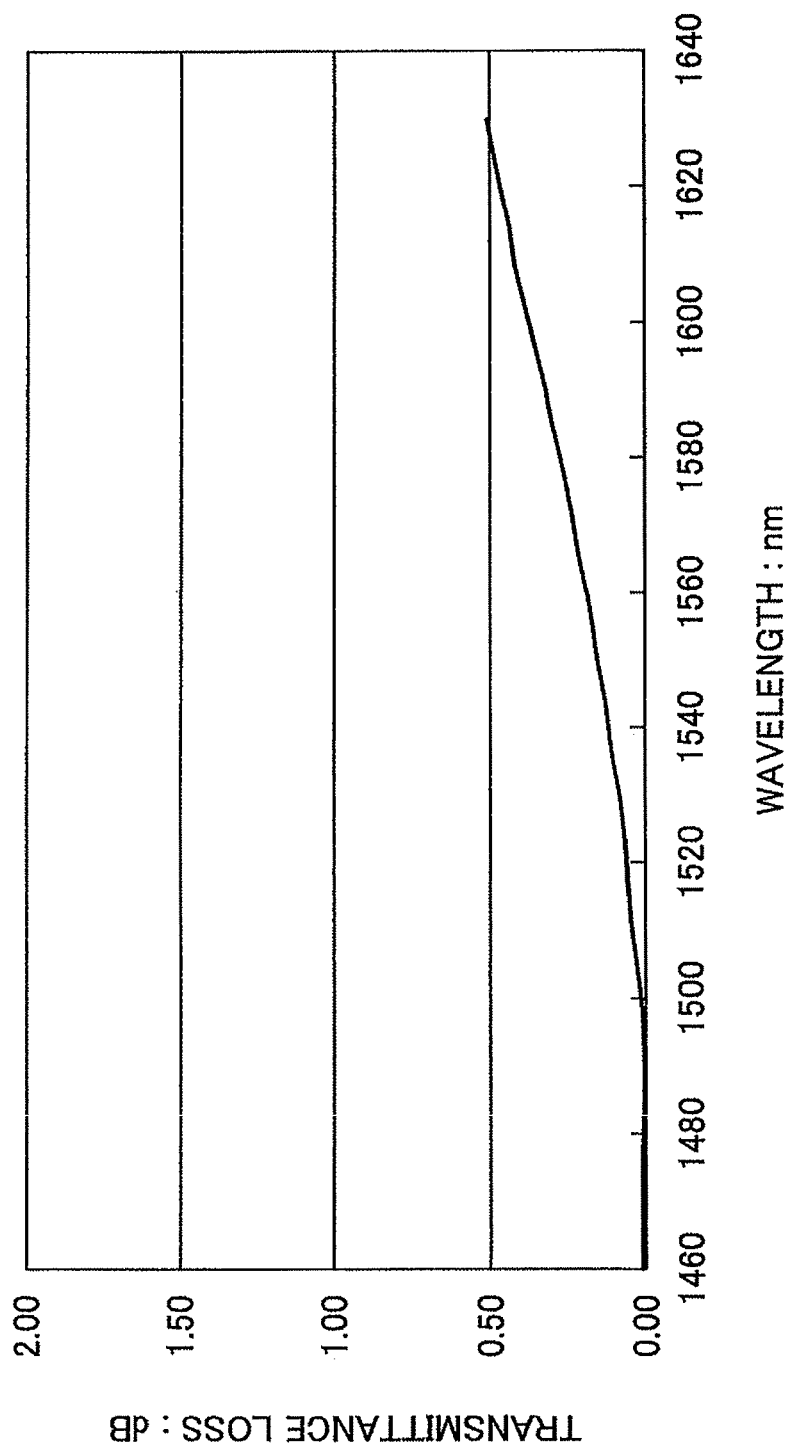
FIG. 15 is a graph indicating the transmittance loss of the polarization filter according to Embodiment 4 relative to wavelength.
Figure 16:
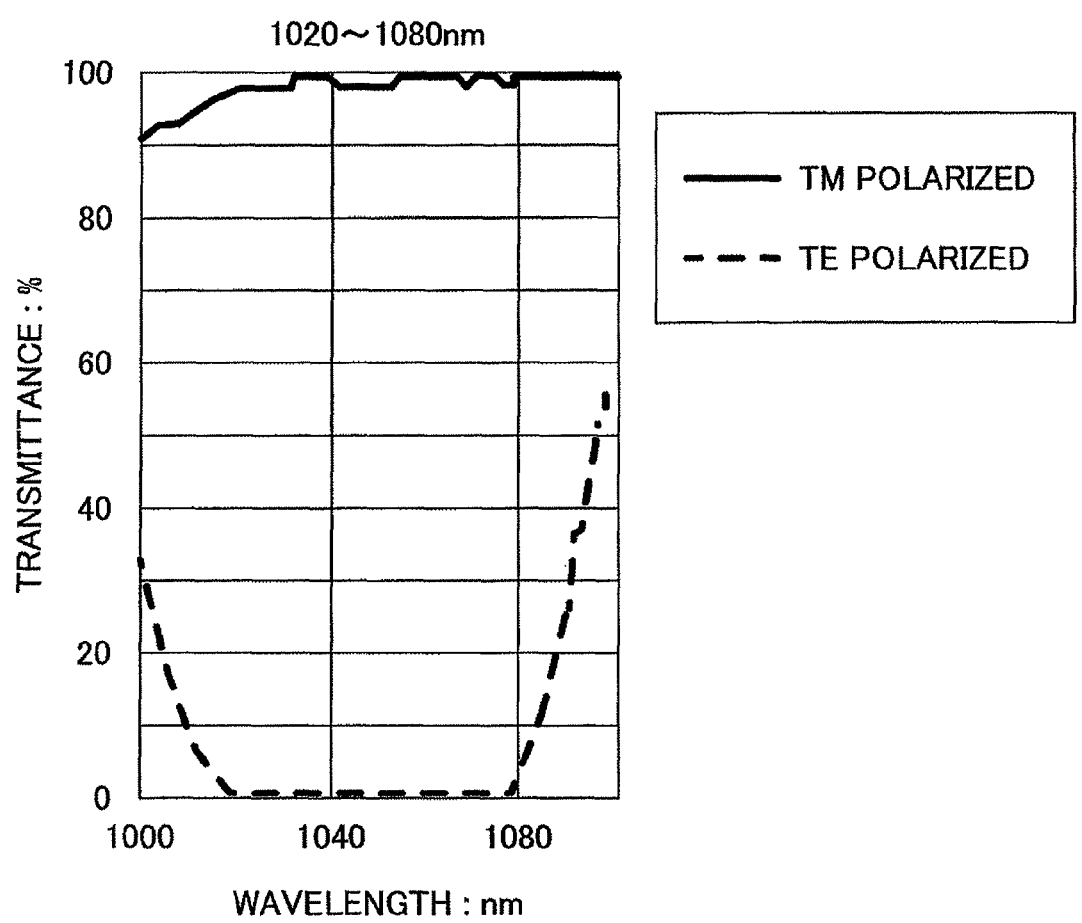
FIG. 16 is a graph indicating the transmittance of a conventional polarizer including a photonic crystal relative to wavelength.

FIGS. 13 through 15 are graphs indicating the diffraction efficiency (FIG. 13), extinction ratio (FIG. 14), and transmittance loss (FIG. 15) of the polarization filter 1 with respect to the wavelength, which were calculated using the aforementioned example values. In FIG. 13, "A" indicates the 0-order transmission of the S-polarized light; "B" indicates the 1st-order diffraction of the P-polarized light; "C" indicates the 1st-order transmission of the P-polarized light; and "D" indicates the 1st-order diffraction of the S-polarized light. As seen from these graphs, the polarization filter 1 has flat characteristics in a range of wavelengths 1480 nm through 1640 nm in which the polarization filter 1 may be used. The range is sufficiently wide compared to conventional examples. For example, while not described in Patent Document 2, in the case of a polarizer including a photonic crystal element, such as described in the Website of Photonic Lattice, Inc. (http://www.photonic-lattice.com/jp/PhC04.html), characteristics degradation is observed at wavelengths outside the wavelength range between 1020 nm to 1080 nm, as shown in FIG. 16.

Embodiment 5

(Method of Manufacturing Optical Element)

Next, methods of manufacturing the polarization filter 1 of Embodiments 1 through 4 are described. The polarization filter 2 may be manufactured by the same methods.

(Method of Manufacturing a Mold Using Quartz as a Base Material)

FIGS. 17A through 17D illustrate a method of manufacturing a mold using quartz as a base material. First, with reference to FIG. 17A, a substrate 100 of a quartz material is prepared, and then a surface of the substrate 100 is coated with a resist 101 to a predetermined thickness and then pre-baked. Then, a pattern having a predetermined pitch and line width may be drawn on the resist 101 using an electron beam 102 in accordance with the required specifications of the polarization filter 1. The drawing step may involve the use of a predetermined software program.

Figure 17A:
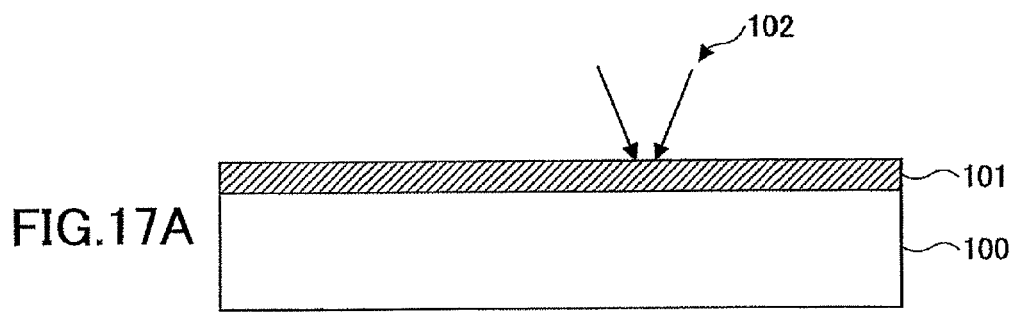
FIGS. 17A through 17D illustrate a process of manufacturing a mold using quartz as a base material.
Figure 17B:
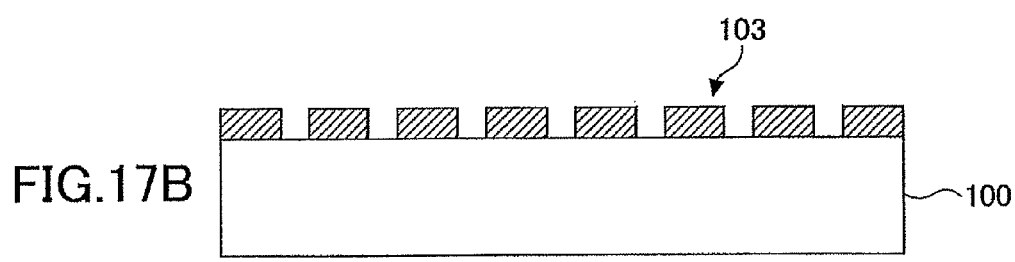

With reference to FIG. 17B, the resist 101 is developed and then rinsed, thus forming grooves for a subwavelength concave-convex structure 103 on the substrate 100. As illustrated in FIG. 17B, the quartz material substrate 100 is exposed at the bottom of the grooves.

Figure 17C:
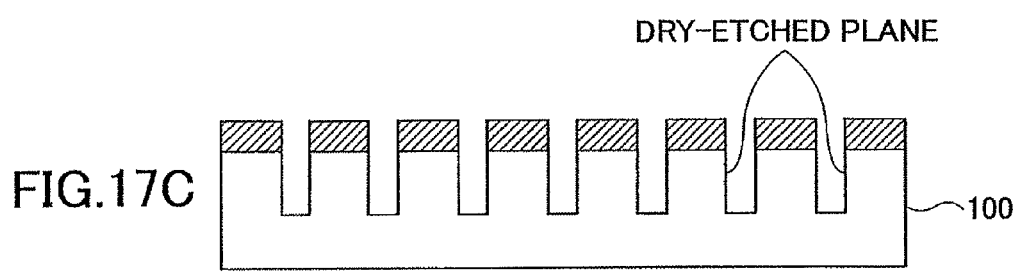

With reference to FIG. 17C, the quartz material substrate 100 is dry-etched using the resist pattern of the subwavelength concave-convex structure 103 as a mask. The etching may involve RIE (Reactive Ion Etching), NLD (Magnetic Neutral Loop Discharge), or TCP (Transformer Coupled Plasma), using $CF_4$ (tetrafluoromethane) or $CF_3$ (trifluoromethyl) gas, for example. The substrate 100 is biased so that etching proceeds in a direction perpendicular to the plane of the substrate 100.

Figure 17D:
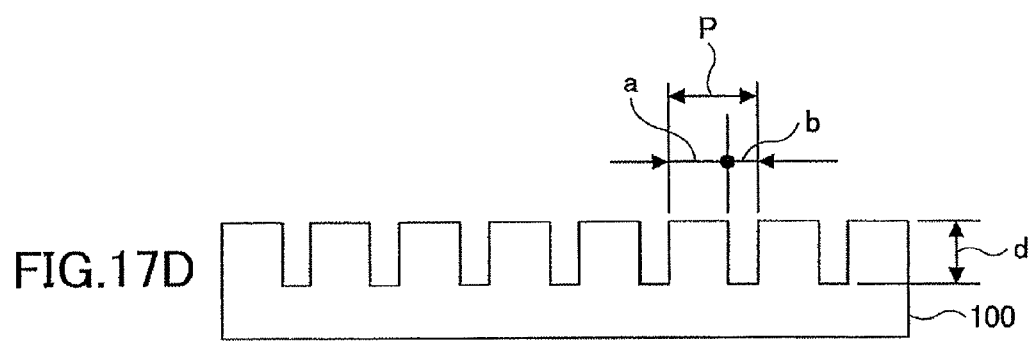

With reference to FIG. 17D, the resist 101 is removed. The removal of the resist 101 may be performed by a method involving introduction of oxygen gas into the dry etching apparatus in which the resist 101 is removed in an oxygen gas plasma, or by a method involving removing the substrate 100 out of the apparatus and cleansing the substrate 100 using CAROS (a mixture of sulfuric acid and hydrogen peroxide solution). The resultant substrate 100 having a pitch P, a land width a, a space width b, and a depth d is used as a quartz mold.

(Method of Manufacturing a Mold Using Silicon as a Base Material)

Another method of manufacturing a mold is described with reference to FIGS. 18A through 18D in which silicon is used as a base material.

Figure 18A:
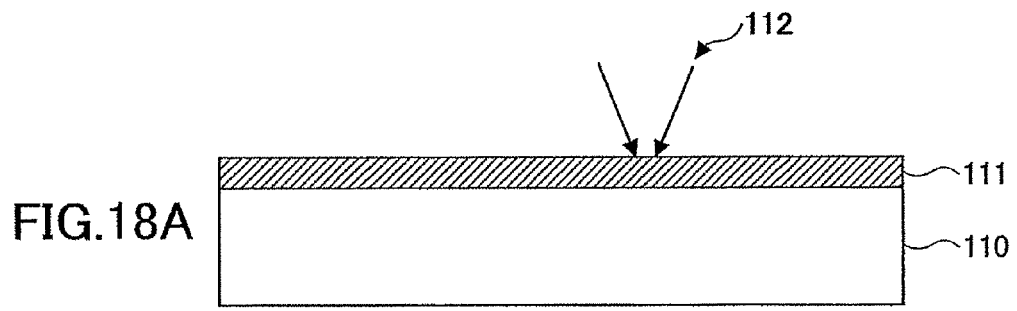
FIGS. 18A through 18D illustrate a process of manufacturing a mold using silicon as a base material.

With reference to FIG. 18A, a silicon substrate 110 is prepared and a surface of the silicon substrate 110 is coated with a resist 111 to a predetermined thickness and then pre-baked. Then, a predetermined pattern having a predetermined pitch and line width in accordance with the specifications of the polarization filter 1 is drawn on the substrate 110 using an electron beam 112. The drawing operation may be performed using a software program.

Figure 18B:
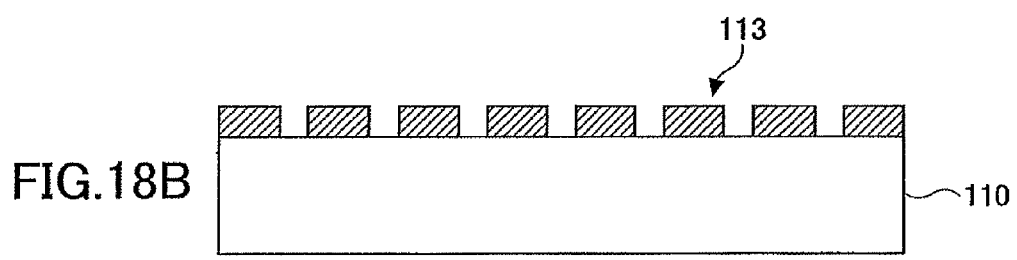

With reference to FIG. 18B, the resist 111 is developed and rinsed, whereby grooves for a subwavelength concave-convex structure 113 is formed on the substrate 110, which is exposed at the bottom of the grooves.

Figure 18C:
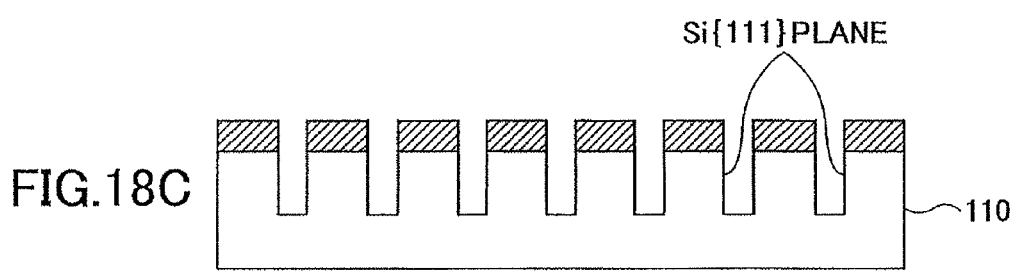

With reference to FIG. 18C, the silicon substrate 110 is subjected to alkali wet etching (using a KOH solution), using the resist pattern of the subwavelength concave-convex structure 113 as a mask. Preferably, the silicon substrate 110 is etched in the depth direction, forming walls in a {111} plane while the pitch of the resist pattern is maintained. A similar structure may be formed by dry etching involving the Bosch process.

Figure 18D:
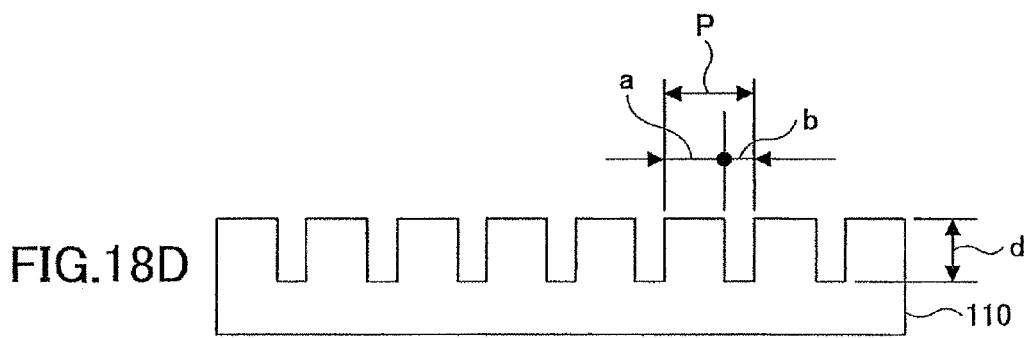

With reference to FIG. 18D, the resist 111 is removed. The resultant substrate 110 having a pitch P, a land width a, a space width b, and a depth d is used as a silicon mold.

The quartz mold or silicon mold may be simply referred to as a "mold".

(Procedure 1 for Making Polarization Filter)

Figure 19A:
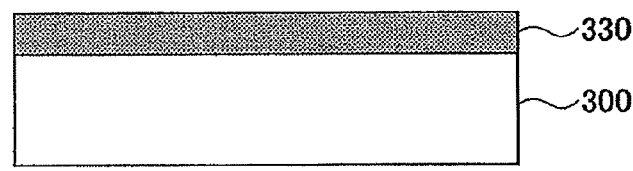
FIGS. 19A through 19G illustrate a process of manufacturing a polarization filter by forming a film of $Ta_2O_5$ on a glass substrate.
Figure 19B:
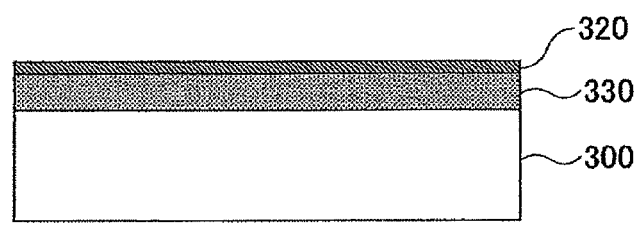

Procedure 1 for making the polarization filter 1 by forming a film 330 of $Ta_2O_5$ on a glass substrate 300 is described with reference to FIGS. 19A through 19G. Referring to FIG. 19A, the $Ta_2O_5$ film 330 (tantalum (V) oxide film) is formed on the glass substrate 300 by sputtering under the following conditions:
1. Substrate temperature: 70° C. to 100° C.
2. Film-forming pressure: 5 to $8 \times 10^{-1}$ Torr
3. Film-forming rate: 0.7 to 1.0 Å/s
4. RF power: 300 W to 500 W Referring to FIG. 19B, the $Ta_2O_5$ film 330 is coated with a UV-curable resin 320 and then pressed with a mold 310 from above. The mold 310 may include the aforementioned silicon mold or quartz mold. For a nano-imprint process for forming a fine structure, the quartz mold may be preferable because of its light-transmitting property. The UV-curable resin 320 may include Grandic RC8790 resin (Dai-Nippon Ink).

Figure 19C:
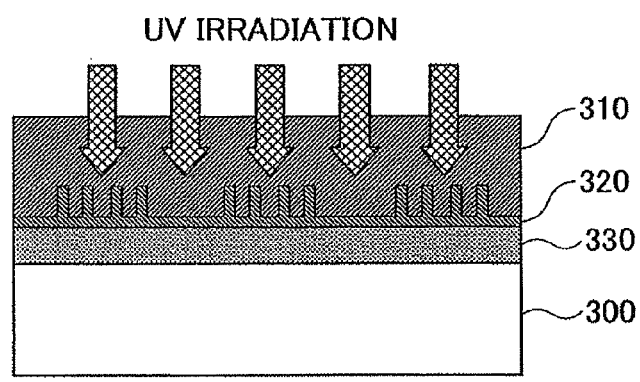

Referring to FIG. 19C, the mold 310 is irradiated with UV (ultraviolet) light from above, thereby curing the UV-curable resin 320. When the mold 310 is a silicon mold, UV irradiation may be performed on the side of the glass substrate 300.

Figure 19D:
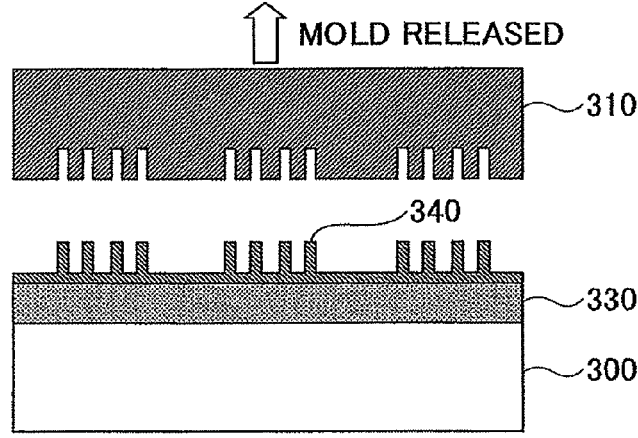

Referring to FIG. 19D, the mold 310 is released, revealing a convex fine structure formed in the UV-curable resin 320.

Figure 19E:
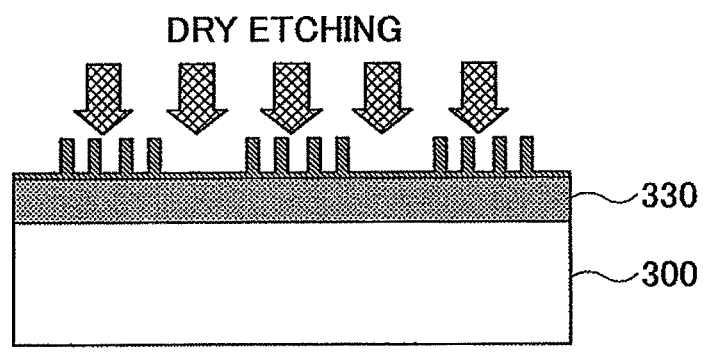
Figure 19F:
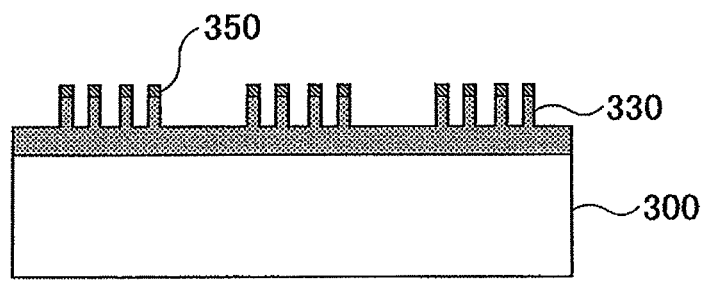
Figure 19G:
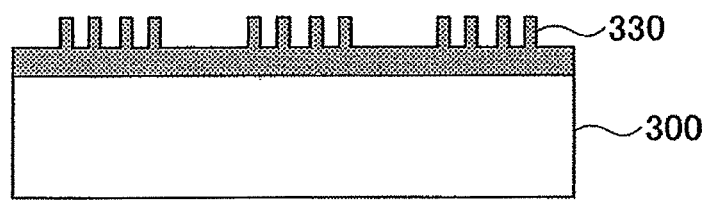

Referring to FIG. 19E, the resin is dry-etched until the $Ta_2O_5$ film 330 is exposed. Preferably, the dry etching is performed under the following conditions:
1. Gas species: oxygen gas ($O_2$)
2. Gas inflow: 20 sccm
3. Pressure: 0.4 Pa
4. Resin etch rate: 30 nm/s
5. Upper bias power: 1 KW
6. Lower bias power: 60 W Thereafter, as illustrated in FIG. 19F, dry etching is performed until a desired depth of the grooves of the $Ta_2O_5$ film 330 is obtained. Preferably, the dry etching is performed under the following conditions:
1. Gas species: $CHF_3$ (trifluoromethane), Ar (argon)
2. Gas inflow
  Ar: 5 sccm
  $CHF_3$: 20 sccm
3. Pressure: 0.3 Pa
4. $Ta_2O_5$ etch rate: 8 nm/s
5. Upper bias power: 1 KW
6. Lower bias power: 400 W Finally, the resin mask 350 remaining at the top is removed by dry etching in an oxygen gas (plasma) atmosphere, thereby obtaining the polarization filter 1 illustrated in FIG. 19G, in which the tantalum (V) oxide ($Ta_2O_5$) 330 on the glass substrate 300 provides the polarization filter function.

(Procedure 2 for Manufacturing Polarization Filter)

Procedure 2 for manufacturing the polarization filter 1 on a glass substrate using a silicon film and a mold is described with reference to FIGS. 20A through 20I.

Figure 20A:
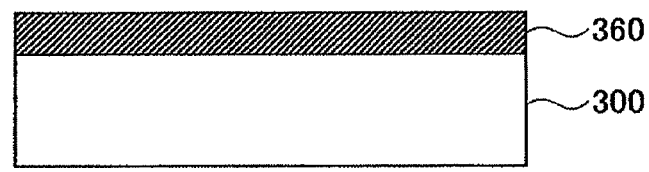
FIGS. 20A through 20I illustrate a process of manufacturing a polarization filter by forming a film of silicon on a glass substrate.
Figure 20B:
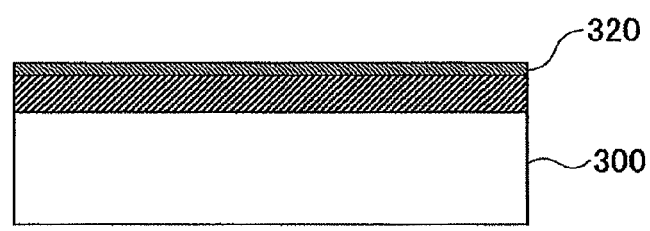

Referring to FIG. 20A, a silicon film (Si film) 360 is formed on a glass substrate 300. Preferably, the Si film 360 may be formed by sputtering under the following conditions:
1. Substrate temperature: 70° C. to 100° C.
2. Film-forming pressure: 7 to $8 \times 10^{-4}$ Torr
3. Film-forming rate: 0.5 to 1.0 Å/s
4. RF power: 100 to 200 W Referring to FIG. 20B, the Si film 360 is coated with a UV-curable resin 320, and then pressed with a mold 310. The mold 310 may include the aforementioned silicon mold or quartz mold. Preferably, in the case of a nano-imprint operation for forming a fine structure, the quartz mold may be more preferable because of its light-transmitting property. The UV-curable resin may include Grandic RC8790 resin (Dai-Nippon Ink).

Figure 20C:
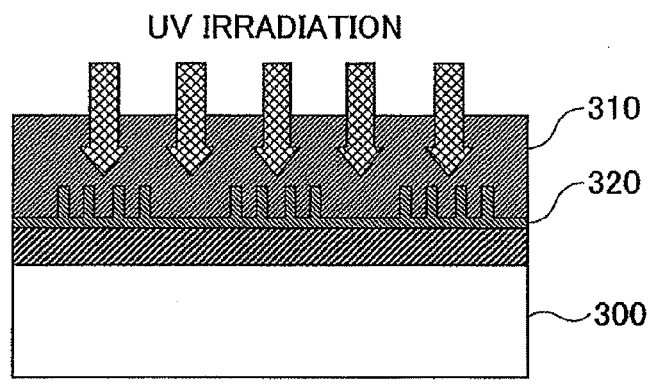

Referring to FIG. 20C, the mold 310 is irradiated with UV (ultraviolet) light from above in order to cure the resin 320. When the mold 310 is a silicon mold, UV irradiation may be performed from the side of the glass substrate 300.

Figure 20D:
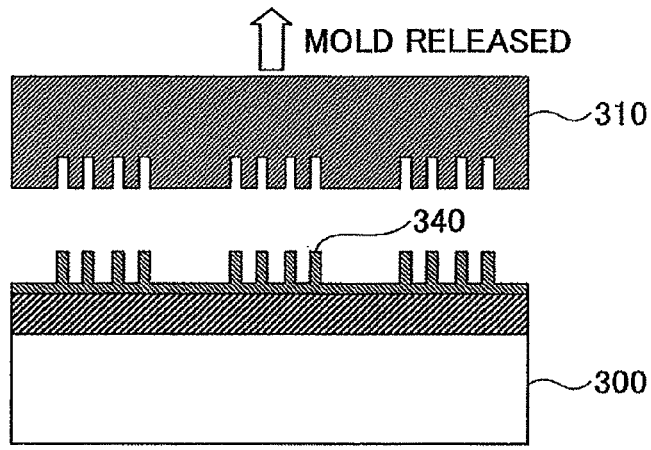

Referring to FIG. 20D, the mold 310 is released, thereby obtaining a convex fine structure formed in the UV-curable resin 320.

Figure 20E:
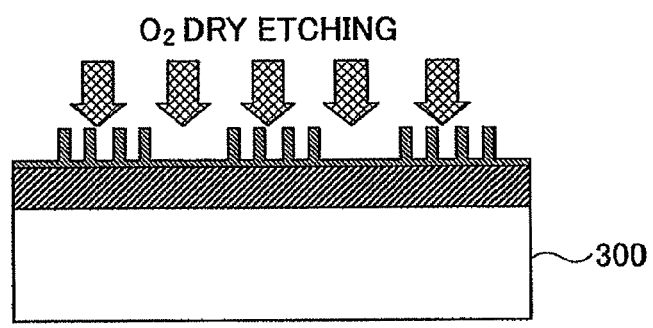
Figure 20F:
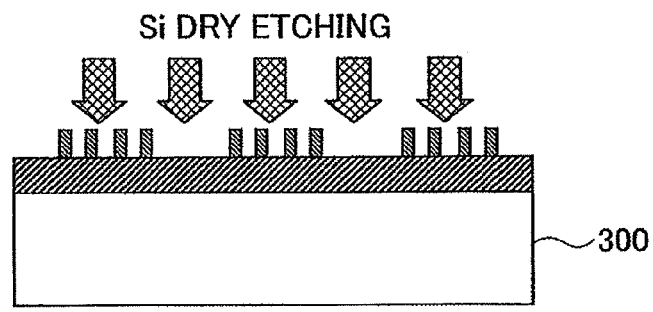
Figure 20G:
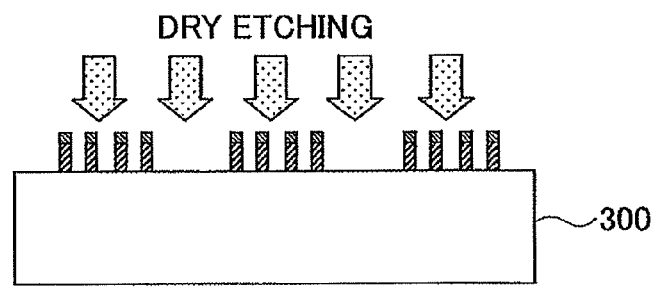
Figure 20H:
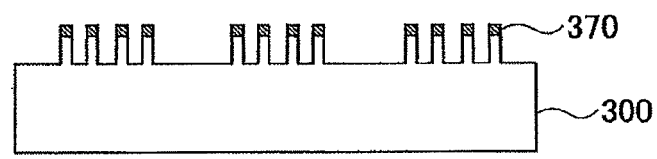

Referring to FIG. 20E, the resin is removed by dry etching until the Si film 360 is exposed. The dry etching may be performed under the following conditions:
1. Gas species: oxygen gas ($O_2$)
2. Gas inflow: 20 sccm
3. Pressure: 0.4 Pa
4. Resin etch rate: 30 nm/s
5. Upper bias power: 1 KW
6. Lower bias power: 60 W Thereafter, the resin and the Si film 360 are dry-etched until the glass substrate 300 is exposed, as illustrated in FIG. 20F. The dry etching may be performed under the following conditions:
1. Gas species: $SF_6$ (sulfur hexafluoride), $CHF_3$
2. Gas inflow
   $SF_6$: 20 sccm
   $CHF_3$: 5 sccm
3. Pressure: 0.3 Pa
4. Resin etch rate: 5 nm/s
5. Si etch rate: 30 nm/sec
6. Upper bias power: 1 KW
7. Lower bias power: 50 W Thereafter, dry etching is performed until a desired depth of glass grooves can be obtained, as illustrated in FIG. 20G. The dry etching may be performed under the following conditions:
1. Gas species: $CHF_3$, Ar
2. Gas inflow
   Ar: 5 sccm
   $CHF_3$: 20 sccm
3. Pressure: 0.3 Pa
4. Si etch rate: 4 nm/s
5. Glass etch rate: 12 nm/s
6. Upper bias power: 1 KW
7. Lower bias power: 400 W Thereafter, the Si film 370 remaining at the top may be removed as illustrated in FIG. 20H. The removal of the remaining Si film 370 may involve a wet removing process using an alkali (KOH) solution.

Figure 20I:
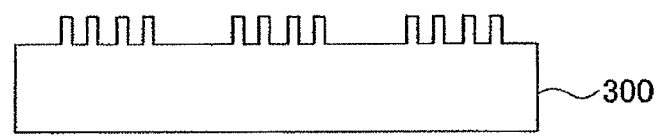

Thus, a polarization filter 1 is completed as illustrated in FIG. 20I, one side of the polarization filter 1 providing the polarization filter function.

(Procedure 3 for Manufacturing Polarization Filter)

With reference to FIGS. 21A through 21G, a process of manufacturing the polarization filter 1 without the use of a mold is described.

Figure 21A:
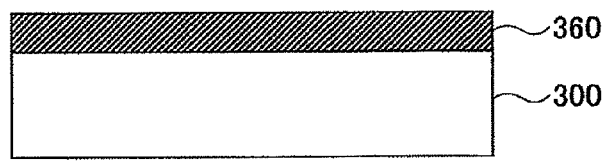
FIGS. 21A through 21G illustrate a process of manufacturing a polarization filter without using a mold.
Figure 21B:
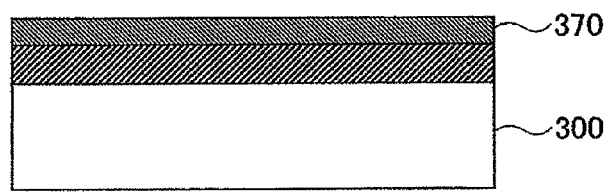

Referring to FIG. 21A, a silicon film (Si film) 360 is formed on a glass substrate 300. The forming of the Si film 360 may involve sputtering under the following conditions:
1. Substrate temperature: 70° C. to 100° C.
2. Film-forming pressure: 7 to $8 \times 10^{-4}$ Torr
3. Film-forming rate: 0.5 to 1.0 Å/s
4. RF power: 100 to 200 W Referring to FIG. 20B, the Si film 360 is coated with a resist 370.

Figure 21C:
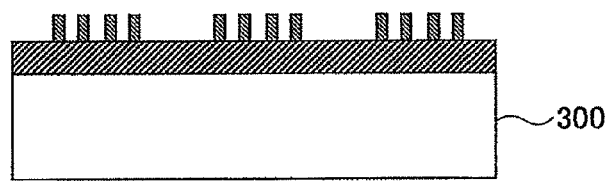

Then, the resist 370 is exposed using a high-accuracy fine-width exposure apparatus, such as an i-line stepper. After exposure, the resist 370 is developed to partially remove the resist 370, thereby exposing the Si film 360, as illustrated in FIG. 21C. The remaining resist is used as a mask pattern for later etching.

Figure 21D:
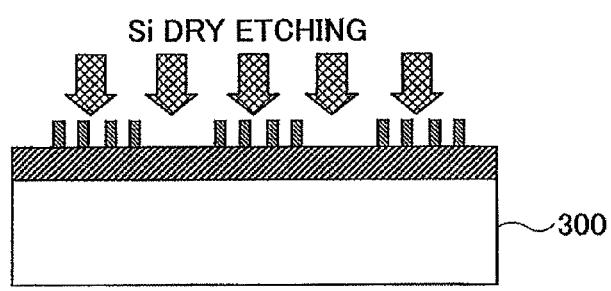
Figure 21E:
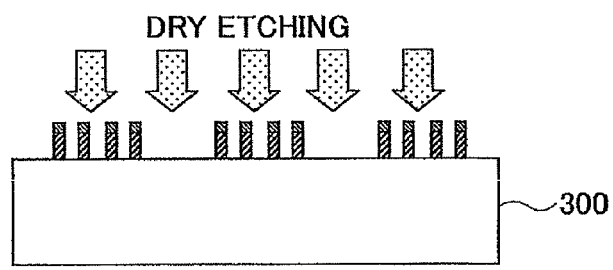
Figure 21F:
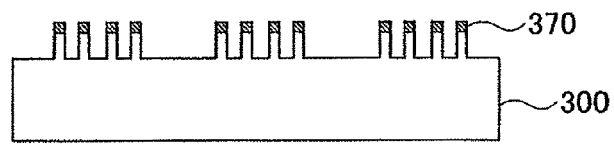
Figure 21G:
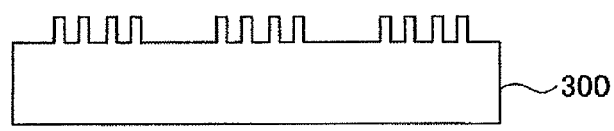

Referring to FIG. 21D, the Si film 360 is dry-etched until the glass substrate 300 is exposed. The dry etching may be performed under the following conditions:
1. Gas species: $SF_6$, $CHF_3$
2. Gas inflow
   $SF_6$: 20 sccm
   $CHF_3$: 5 sccm
3. Pressure: 0.4 Pa
4. Si etch rate: 30 nm/s
5. Upper bias power: 1 KW
6. Lower bias power: 50 W Thereafter, as illustrated FIG. 21E, dry etching is performed until a desired depth of grooves is obtained in the glass substrate 300. The dry etching may be performed under the following conditions:

1. Gas species: $CHF_3$, Ar
2. Gas inflow
   Ar: 5 sccm
   $CHF_3$: 20 sccm
3. Pressure: 0.3 Pa
4. Glass etch rate: 12 nm/s
5. Upper bias power: 1 KW
6. Lower bias power: 400 W Then, as illustrated in FIG. 21F, the Si film 370 remaining at the top is removed. The removal of the Si film 370 may involve a wet process using an alkali (KOH) solution. Thus, as illustrated in FIG. 21G, a polarization filter 1 is completed, in which one side of the glass substrate provides the polarization filter function.

Figure 5:
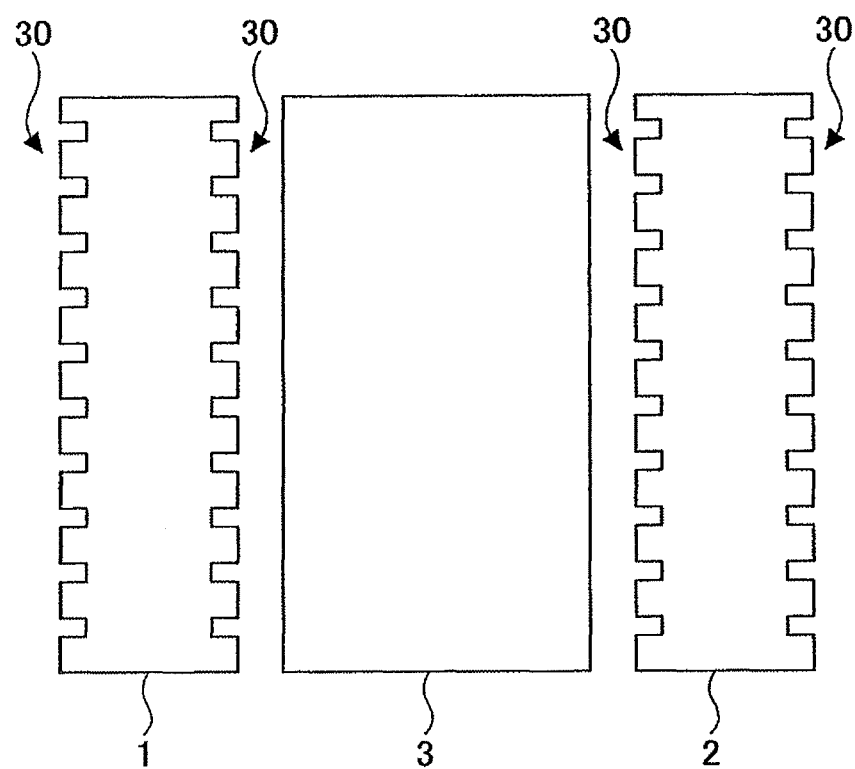
FIG. 5 illustrates an optical isolator according to another embodiment of the present invention.

Thus, in accordance with Procedures 1 through 3, polarization filters are manufactured having a lattice shape (diffracting structure) on one side of the polarization filter. However, similar methods may be used for manufacturing a polarization filter having lattice shapes (diffracting structures) on both sides of the polarization filter, as illustrated in FIG. 5.

Furthermore, similar methods to those described above may also be used for forming lattice shapes (diffracting structures) directly on both sides of the Faraday rotator 3 of the optical isolator 11 according to Embodiment 2, as illustrated in FIG. 6.

Thus, in accordance with an embodiment of the present invention, an optical element is provided which may be suitably used in an optical isolator configured to allow the passage of light in a forward direction and block the passage of light in a backward direction. Such an optical isolator may be used in an optical communication device, an optical information processing apparatus, an optical pickup of an optical disc apparatus, or a projector optical system, for example.

Although this invention has been described in detail with reference to certain embodiments, variations and modifications exist within the scope and spirit of the invention as described and defined in the following claims.

The present application is based on the Japanese Priority Application No. 2009-110415 filed Apr. 30, 2009, the entire contents of which are hereby incorporated by reference.

The invention claimed is:

1. A polarization filter comprising:
   an optical element of configured to transmit incident light having a particular polarization direction mainly by 0-order transmission and configured to diffract incident light having a polarization direction perpendicular to the particular polarization direction, the optical element including: a periodic structure having a period equal to or greater than the wavelength of the incident light, wherein the periodic structure includes first and second subwavelength concave-convex structures formed perpendicularly adjacent to each other in each period of the periodic structure, the first and the second subwavelength concave-convex structures having a period less than the wavelength of the incident light;
   wherein a filling factor of the first subwavelength concave-convex structures and a filling factor of the second subwavelength concave-convex structures are determined such that the first and the second subwavelength concave-convex structures have the same effective refraction index with respect to the incident light having the particular polarization direction, and wherein the filling factor of the first subwavelength concave-convex structures is different from the filling factor of the second subwavelength concave-convex structures, and a groove depth of the first subwavelength concave-convex structures and a groove depth of the second subwavelength concave-convex structures are determined such that the first and the second subwavelength concave-convex structures have a phase difference π with respect to the incident light having the polarization direction perpendicular to the particular polarization direction, and wherein the groove depth of the first subwavelength concave-convex structures is the same as the groove depth of the second subwavelength concave-convex structures;

wherein the polarization filter includes $Ta_2O_5$ and a glass substrate, the $Ta_2O_5$ being located on the glass substrate, and wherein the first and the second subwavelength concave-convex structures are located in the $Ta_7O_5$.

2. A polarization filter of claim 1, wherein the first and the second subwavelength concave-convex structures are etched into the $Ta_2O_5$.

3. An optical isolator comprising a polarization direction rotator disposed between a first polarization filter and a second polarization filter, the first and the second polarization filters being configured to transmit incident light having a particular polarization direction mainly by 0-order transmission and configured to diffract incident light having a polarization direction perpendicular to the particular polarization direction, wherein the first and the second polarization filters include a periodic structure having a period equal to or greater than the wavelength of the incident light, wherein the periodic structure includes first and second subwavelength concave-convex structures perpendicularly disposed adjacent to each other in each period of the periodic structure, the first and the second subwavelength concave-convex structures having a period less than the wavelength of the incident light, and wherein a filling factor of the first subwavelength concave-convex structures and a filling factor of the second subwavelength concave-convex structures are determined such that the first and the second subwavelength concave-convex structures have the same effective refraction index with respect to the incident light having the particular polarization direction, and wherein the filling factor of the first subwavelength concave-convex structures is different from the filling factor of the second subwavelength concave-convex structures, and a groove depth of the first subwavelength concave-convex structures and a groove depth of the second subwavelength concave-convex structures are determined such that the first and the second subwavelength concave-convex structures have a phase difference π with respect to the incident light having the polarization direction perpendicular to the particular polarization direction, and wherein the groove depth of the first subwavelength concave-convex structures is the same as the groove depth of the second subwavelength concave-convex structures; and wherein the optical isolator includes $Ta_2O_5$ and a glass substrate, the $Ta_2O_5$ being located on the glass substrate, and wherein the first and the second subwavelength concave-convex structures are located in the $Ta_2O_5$.

4. An optical apparatus comprising: the optical isolator of claim 3; and a light source for emitting a beam toward the optical isolator.

5. An optical isolator comprising:
a polarization direction rotator; and
a polarization filter formed on at least one side of the polarization direction rotator,
the polarization filter being configured to transmit incident light having a particular polarization direction mainly by 0-order transmission and configured to diffract incident light having a polarization direction perpendicular to the particular polarization direction, wherein the polarization filter includes a periodic structure having a period equal to or greater than the wavelength of the incident light, wherein the periodic structure includes first and second subwavelength concave-convex structures formed perpendicularly adjacent to each other in each period of the periodic structure, the first and the second subwavelength concave-convex structures having a period less than the wavelength of the incident light, and wherein a filling factor of the first subwavelength concave-convex structures and a filling factor of the second subwavelength concave-convex structures are determined such that the first and the second subwavelength concave-convex structures have the same effective refraction index with respect to the incident light having the particular polarization direction, and wherein the filling factor of the first subwavelength concave-convex structures is different from the filling factor of the second subwavelength concave-convex structures, and a groove depth of the first subwavelength concave-convex structures and a groove depth of the second subwavelength concave-convex structures are determined such that the first and the second subwavelength concave-convex structures have a phase difference τ with respect to the incident light having the polarization direction perpendicular to the particular polarization direction, and wherein the groove depth of the first subwavelength concave-convex structures is the same as the groove depth of the second subwavelength concave-convex structures; and wherein the optical isolator includes $Ta_2O_5$ and a glass substrate, the $Ta_2O_5$ being located on the glass substrate, and wherein the first and the second subwavelength concave-convex structures are located in the $Ta_2O_5$.

6. An optical apparatus comprising: the optical isolator of claim 5; and a light source for emitting a beam toward the optical isolator.

* * * * *